United States Patent
Nadakuduti et al.

(10) Patent No.: US 11,457,416 B2
(45) Date of Patent: Sep. 27, 2022

(54) EVALUATING RADIO FREQUENCY (RF) EXPOSURE IN REAL TIME

(71) Applicant: QUALCOMM Incorporated, San Diego, CA (US)

(72) Inventors: Jagadish Nadakuduti, Mission Viejo, CA (US); Lin Lu, San Diego, CA (US); Paul Guckian, La Jolla, CA (US); Mingming Cai, San Jose, CA (US); Junsheng Han, Sunnyvale, CA (US); Udara Fernando, San Diego, CA (US); Raghu Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/141,150

(22) Filed: Jan. 4, 2021

(65) Prior Publication Data

US 2021/0127337 A1   Apr. 29, 2021

Related U.S. Application Data

(63) Continuation of application No. PCT/US2019/040556, filed on Jul. 3, 2019, which is a continuation of application No. 16/460,894, filed on Jul. 2, 2019, now Pat. No. 10,652,833.

(Continued)

(51) Int. Cl.
*H04B 7/00*       (2006.01)
*H04W 52/22*      (2009.01)
(Continued)

(52) U.S. Cl.
CPC ........ *H04W 52/225* (2013.01); *H04B 1/3838* (2013.01); *H04W 52/12* (2013.01)

(58) Field of Classification Search
CPC ... H04W 52/225; H04W 52/12; H04B 1/3838
(Continued)

(56) References Cited

U.S. PATENT DOCUMENTS 8,031,686 B2 * 10/2011 Li ................... H04L 5/0073
                                                370/335
8,626,101 B2 *  1/2014 Stallman ............. H04B 1/3838
                                                455/272
(Continued)

FOREIGN PATENT DOCUMENTS

EP          2814292 A1    12/2014
KR      20160148444 A    12/2016
(Continued)

OTHER PUBLICATIONS

Interdigital et al.: "Power Sharing Mechanisms with LTE-NR DC and NR," 3GPP Draft; R1-1714118 (R15 NR WI AI 6171 Power Sharing), 3rd Generation Partnership Project (3GPP), Mobile Competence Centre; 650, Route Des Lucioles; F-06921 Sophia-Antipolis Cedex; France, vol. RAN WG1, No. Prague, Czech Republic; Aug. 21, 2017-Aug. 25, 2017, Aug. 20, 2017, XP051316907, 7 pages, Retrieved from the Internet: URL: http://www.3gpp.org/ftp/Meetings_3GPP_SYNC/RAN1/Docs/ [retrieved on Aug. 20, 2017], section 4.1.3.

(Continued)

*Primary Examiner* — April G Gonzales
(74) *Attorney, Agent, or Firm* — Loza & Loza, LLP/Qualcomm

(57) ABSTRACT

In certain aspects, a method implemented in a wireless device includes determining a specific absorption rate (SAR) distribution for a first wireless communication technology, determining a power density (PD) distribution for a second wireless communication technology, and combining the SAR distribution and the PD distribution to generate a combined RF exposure distribution. The method also includes determining at least one first maximum allowable power level and at least one second maximum allowable power level for a future time slot based on the combined RF exposure distribution, setting at least one transmission power limit for a first transmitter in the future time slot based on the at least one first maximum allowable power level, and setting at least one transmission power limit for a second transmitter in the future time slot based on the at least one second maximum allowable power level.

40 Claims, 17 Drawing Sheets

Related U.S. Application Data

(60) Provisional application No. 62/694,405, filed on Jul. 5, 2018, provisional application No. 62/696,687, filed on Jul. 11, 2018.

(51) Int. Cl.
*H04B 1/3827* (2015.01)
*H04W 52/12* (2009.01)

(58) Field of Classification Search
USPC .................................................. 455/522
See application file for complete search history.

(56) References Cited

U.S. PATENT DOCUMENTS

| | | | | |
|---|---|---|---|---|
| 8,811,918 | B2* | 8/2014 | Rath | H04B 7/0689 455/127.2 |
| 8,825,102 | B2* | 9/2014 | Chakraborty | H04W 52/346 455/67.11 |
| 9,237,531 | B2* | 1/2016 | Lu | H04W 52/367 |
| 9,461,687 | B2* | 10/2016 | Ding | H04B 1/3838 |
| 10,038,465 | B2* | 7/2018 | Park | H04W 52/228 |
| 10,129,834 | B2* | 11/2018 | Yao | H04W 52/367 |
| 10,224,974 | B2* | 3/2019 | Mercer | H01P 1/38 |
| 10,652,833 | B2* | 5/2020 | Nadakuduti | H04W 52/367 |
| 10,652,839 | B2* | 5/2020 | Park | H04W 52/146 |
| 10,727,889 | B2* | 7/2020 | Ban | H04B 1/3838 |
| 11,115,073 | B2* | 9/2021 | Hou | H04W 52/367 |
| 2003/0091123 | A1* | 5/2003 | Dartois | H04L 27/368 375/297 |
| 2003/0092462 | A1* | 5/2003 | Dartois | H03G 3/3047 375/296 |
| 2004/0038697 | A1* | 2/2004 | Attar | H04W 52/48 455/522 |
| 2006/0003790 | A1* | 1/2006 | Marinier | H04W 52/343 455/522 |
| 2007/0133483 | A1* | 6/2007 | Lee | H04W 52/343 370/338 |
| 2008/0198775 | A1* | 8/2008 | Nejatian | H04W 52/52 370/280 |
| 2011/0224924 | A1* | 9/2011 | Eichfelder | G01R 33/36 702/57 |
| 2012/0021707 | A1* | 1/2012 | Forrester | H04W 52/30 455/115.3 |
| 2012/0157001 | A1* | 6/2012 | Chiu | H04B 7/0874 455/67.11 |
| 2013/0176876 | A1* | 7/2013 | Wakayama | H04W 52/223 370/252 |
| 2016/0323749 | A1* | 11/2016 | Yang | H04W 24/02 |
| 2016/0374031 | A1* | 12/2016 | Lee | H04W 52/346 |
| 2017/0322247 | A1* | 11/2017 | Lu | G01R 29/0857 |
| 2017/0338550 | A1* | 11/2017 | Alon | H01Q 3/267 |
| 2018/0137897 | A1* | 5/2018 | Shiau | G11C 7/1006 |
| 2020/0374882 | A1* | 11/2020 | Cai | H04W 72/0413 |

FOREIGN PATENT DOCUMENTS

| | | |
|---|---|---|
| WO | 2012018625 A1 | 2/2012 |
| WO | 2015082153 A1 | 6/2015 |
| WO | 2019064009 A1 | 4/2019 |

OTHER PUBLICATIONS

International Commission on Non-Ionizing Radiation Protection Icnirp: "Guidelines for Limiting Exposure to Time-varying Electric, Magnetic and Electromagnetic Fields (Up to 300 GHZ) ICNIRP Guidelines, Guidelines for Limiting Exposure to Time-varying Electric, Magnetic and Electromagnetic Fields (Up to 300 GHZ)", Jan. 1, 1999, XP055622404, Retrieved from the Internet: URL:https://www.icnirp.org/cms/upload/publications/ICNIRPemfgdl.pdf [retrieved on Sep. 16, 2019], 38 pages, p. 513, right-hand column, lines 18-33 tables 4,6,7.

International Search Report and Written Opinion—PCT/US2019/040556—ISA/EPO—dated Dec. 2, 2019.

Kanda, et al., "Faster Determination of Mass-Averaged SAR from 2-D Area Scans," IEEE Transactions on Microwave Theory and Techniques, vol. 52, No. 8, Aug. 2004, pp. 2013-2020.

Partial International Search Report—PCT/US2019/040556—ISA/EPO—dated Oct. 4, 2019.

Nasim et al.: "Human Exposure To RF Fields in 5G Downlink", EESS.SP, Nov. 10, 2017, 1711.03683, 6 pages, Retrieved from the Internet: URL: https://arxiv.org/pdf/1711.03683.pdf.

Qureshi et al.: :"Assessment of Exposure to Radio Frequency Electromagnetic Fields From Smart Utility Meters in GB; Part II) Numerical Assessment of Induced SAR Within the Human Body", Bioelectromagnetics, Nov. 16, 2017, 39:200-216 (2018), 17 pages, Retrieved from the Internet: URL: https://pubmed.ncbi.nlm.nih.gov/29143352/.

IEEE International Committee on Electromagnetic Safety (SCC39), "IEEE Standard for Safety Levels with Respect to Human Exposure to Radio Frequency Electromagnetic Fields, 3 kHz to 300 GHz", IEEE STD C95.1 2005 (Revision of IEEE Std C95.1-1991), Oct. 3, 2005, 250 pages, Retrieved from the Internet: URL: https://emfguide.tu.int/pdfs/C95.Jan. 2005.pdf.

Ericsson, 3GPP TSG-RAN WG1 #90, "Power Sharing for LTE-NR Dual Connectivity", Agenda Item 6.1.7.1, Prague, Czech Repbulic, Aug. 21-27, 2017, R11714460, 3 pages, Retrieved from the Internet: URL https://www.3gpp.org/ftp/TSG RAN/WG1_RL1/TSGR1_90/Docs/R1-1714460.zip.

Federal Communications Commission, "RF Exposure Procedures and Equipment Authorization Policies for Mobile and Portable Devices", Oct. 23, 2015, 447498 D01 General RF Exposure Guidance v06, 34 pages, Retrieved from the Internet: URL: https://apps.fcc.gov/kdb/GetAttachment.html?id=f8lQgJxTTL5y0oRi0cpAuA%3D%3D&desc=447498%20D01%20General%20RF%20Exposure%20Guidance%20v06&tracking_number=20676.

Motorola Solutions "Declaration of Compliance: PCII report" May 27, 2018, Report ID: P11337-EME-00004, 14 pages, Retrieved from the Internet: URL: https://fccid.io/ABZ99FT3091/RF-Exposure-Info/SAR-Report-3872416.pdf.

Intel Corporation, "RF Exposure Report for Smart Bracelet Model No. MICA, FCC ID 2AB8ZND2, Report No. 14U19370-E4", Dec. 5, 2014, 10 pages, Retrieved from the Internet: URL https://fcc.report/FCC-ID/2AB8ZND2/2465841.pdf.

Edimax Technology Co., Ltd. "CE EMF Test Report", Report No. EA471572, Nov. 15, 2014, 7 pages, Retrieved from the Internet: URL: https://usermanual.wiki/Pdf/Ea471572EdimaxEn62311Mpe.2104729901/view.

Federal Communications Commission, "First Report and Order Further Notice of Proposed Rule Making and Notice of Inquiry", FCC 13-39, Mar. 29, 2013, 202 pages, Retrieved from the Internet URL: https://docs.fcc.gov/public/attachments/FCC-13-39A1.pdf.

\* cited by examiner

| Transmit Scenario Index | Transmission Power at Reference PD |
|---|---|
| 1 | $TX_1$ |
| 2 | $TX_2$ |
| 3 | $TX_3$ |
| ⋮ | ⋮ |
| n | $TX_n$ |

EVALUATING RADIO FREQUENCY (RF) EXPOSURE IN REAL TIME

RELATED APPLICATIONS

This application claims priority to International Application No. PCT/US2019/040556 filed on Jul. 3, 2019, which claims priority to U.S. application Ser. No. 16/460,894 filed on Jul. 2, 2019, U.S. Provisional Application No. 62/694,405 filed on Jul. 5, 2018, and U.S. Provisional Application No. 62/696,687 filed on Jul. 11, 2018, the entire specifications of which are incorporated herein by reference. Further, this application claims benefit to European Application No. 19745440.8 filed on Dec. 22, 2020, Indian Application No. 20204705630 filed on Dec. 24, 2020 and Japanese Application No. Unknown filed on Dec. 25, 2020, all of which claim priority to International Application No. PCT/US2019/040556 filed on Jul. 3, 2019.

BACKGROUND

Field

Aspects of the present disclosure relate generally to wireless devices, and more particularly, to assessing radio frequency (RF) exposure from a wireless device.

Background

Modern wireless devices (e.g., cellular phones) are generally required to limit a user's exposure to radio frequency (RF) radiation according to RF exposure limits set by domestic and international regulators. To ensure that a wireless device complies with an RF exposure limit, techniques have been developed to enable the wireless device to assess RF exposure from the wireless device in real time and adjust the transmission power of the wireless device accordingly to comply with the RF exposure limit.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A first aspect relates to a wireless device. The wireless device includes a first transmitter configured to transmit first signals according to a first wireless communication technology, a second transmitter configured to transmit second signals according to a second wireless communication technology, and a processor coupled to the first and second transmitters. The processor is configured to determine a specific absorption rate (SAR) distribution for the first wireless communication technology, determine a power density (PD) distribution for the second wireless communication technology, combine the SAR distribution and the PD distribution to generate a combined RF exposure distribution, determine at least one first maximum allowable power level and at least one second maximum allowable power level for a future time slot based on the combined RF exposure distribution, set at least one transmission power limit for the first transmitter in the future time slot based on the at least one first maximum allowable power level, and set at least one transmission power limit for the second transmitter in the future time slot based on the at least one second maximum allowable power level.

A second aspect relates to a method implemented in a wireless device. The method includes determining a specific absorption rate (SAR) distribution for a first wireless communication technology, determining a power density (PD) distribution for a second wireless communication technology, and combining the SAR distribution and the PD distribution to generate a combined RF exposure distribution. The method also includes determining at least one first maximum allowable power level and at least one second maximum allowable power level for a future time slot based on the combined RF exposure distribution, setting at least one transmission power limit for a first transmitter in the future time slot based on the at least one first maximum allowable power level, and setting at least one transmission power limit for a second transmitter in the future time slot based on the at least one second maximum allowable power level.

A third aspect relates to a computer readable medium. The computer readable medium includes instructions stored thereon for determining a specific absorption rate (SAR) distribution for a first wireless communication technology, determining a power density (PD) distribution for a second wireless communication technology, and combining the SAR distribution and the PD distribution to generate a combined RF exposure distribution. The computer readable medium also includes instructions stored thereon for determining at least one first maximum allowable power level and at least one second maximum allowable power level for a future time slot based on the combined RF exposure distribution, setting at least one transmission power limit for a first transmitter in the future time slot based on the at least one first maximum allowable power level, and setting at least one transmission power limit for a second transmitter in the future time slot based on the at least one second maximum allowable power level.

A fourth aspect relates to a wireless device. The wireless device includes a transmitter, and a processor coupled to the transmitter. The processor is configured to determine a specific absorption rate (SAR) distribution for a first wireless communication technology, determine a power density (PD) distribution for a second wireless communication technology, combine the SAR distribution and the PD distribution to generate a combined RF exposure distribution, and determine a maximum allowable time-average power level for a future time slot based on the combined RF exposure distribution, wherein the future time slot comprises multiple sub-time slots. The processor is also configured to determine a maximum allowable power level for each of the multiple sub-time slots based on the maximum allowable time-average power level for the future time slot, and set a transmission power limit for the transmitter in each of the sub-time slots based on the respective maximum allowable power level.

A fifth aspect relates to a wireless device. The wireless device includes a transmitter, and a processor coupled to the transmitter. The processor is configured to determine a specific absorption rate (SAR) distribution for a first wireless communication technology, determine a power density (PD) distribution for a second wireless communication technology, combine the SAR distribution and the PD distribution to generate a combined RF exposure distribution, and determine a PD limit for a future time slot based on the combined RF exposure distribution, wherein the future time slot comprises multiple sub-time slots. The processor is also configured to determine a maximum allowable power level for each of the multiple sub-time slots based on the PD limit for the future time slot, and set a transmission power limit for the transmitter in each of the sub-time slots based on the respective maximum allowable power level.

A sixth aspect relates to a wireless device. The wireless device includes a transmitter, and a processor coupled to the transmitter. The processor is configured to determine a maximum allowable time-average power level for a future time slot, determine a maximum allowable transmission duty cycle for the future time slot based on the determined maximum allowable time-average power level and a maximum allowable power level, and set a transmission duty cycle limit for the transmitter in the future time slot based on the maximum allowable transmission duty cycle.

A seventh aspect relates to a wireless device. The wireless device includes a transmitter, and a processor coupled to the transmitter. The processor is configured to determine a maximum allowable time-average power level for a future time slot, determine a maximum allowable peak power level for the future time slot based on the determined maximum allowable time-average power level and a maximum allowable duty cycle, and set a peak power limit for the transmitter in the future time slot based on the maximum allowable peak power level.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

BRIEF DESCRIPTION OF THE DRAWINGS

FIG. 18 shows an exemplary table for converting an allowed PD into a maximum allowable power level according to certain aspects of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
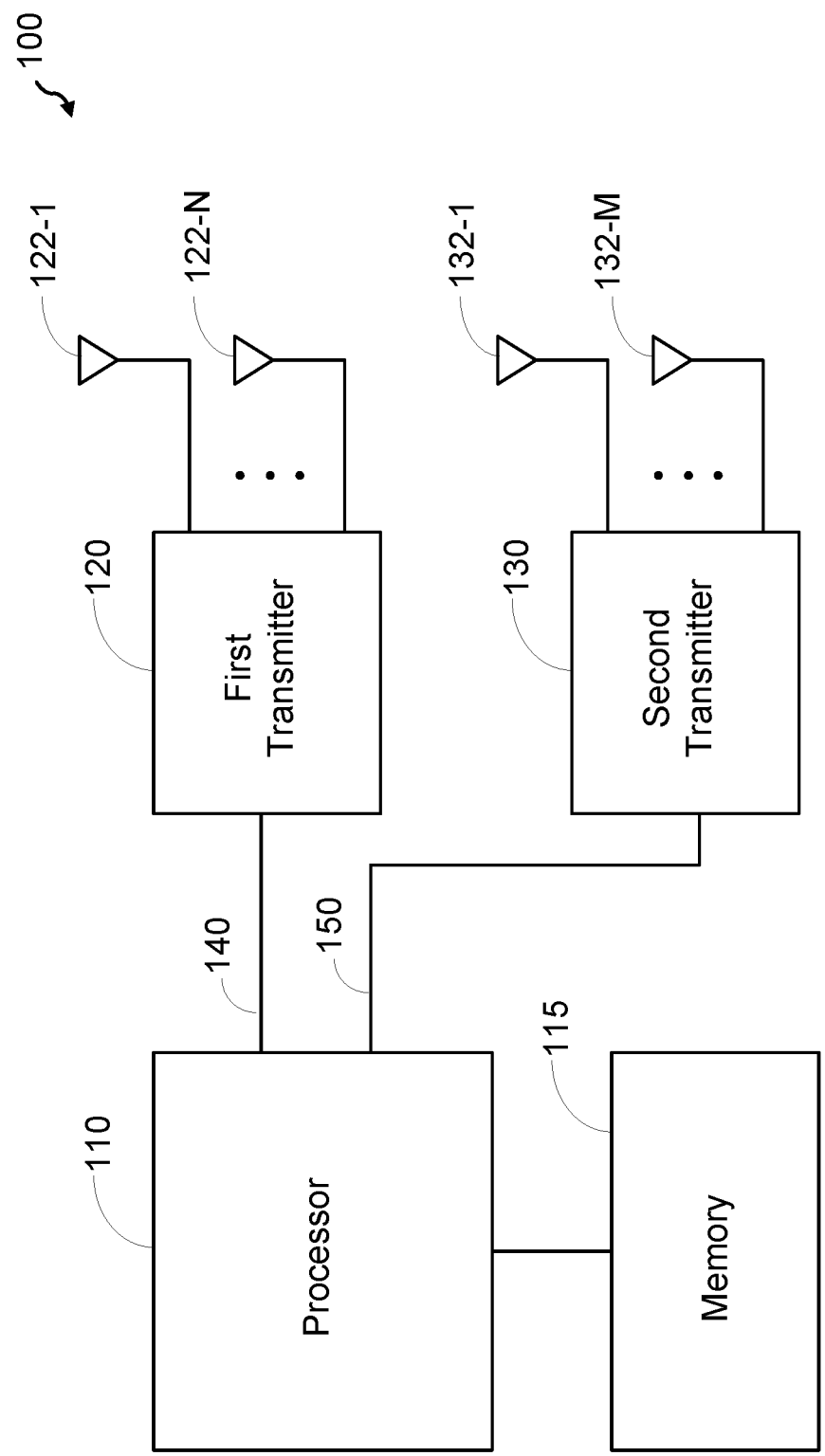
FIG. 1 shows an example of a wireless device in which aspects of the present disclosure may be implemented.

FIG. 1 shows an example of a wireless device 100 in which aspects of the present disclosure described herein may be implemented. The wireless device 100 may comprise a mobile wireless device (e.g., a cellular phone), a laptop, a wireless access point, or some other wireless device.

The wireless device 100 includes a processor 110, and a memory 115 coupled to the processor 110. The memory 115 may store instructions that, when executed by the processor 110, cause the processor 110 to perform one or more of the operations described herein. The processor 110 may be implemented with a general-purpose processor, a digital signal processor (DSP), a baseband modem, an application specific integrated circuit (ASIC), a field programmable gate array (FPGA) or other programmable logic device (PLD), discrete gate logic, discrete hardware components, or any combination thereof configured to perform one or more of the operations described herein.

The wireless device 100 also includes a first transmitter 120, a first plurality of antennas 122-1 to 122-N coupled to the first transmitter 120, and a first bus 140 coupled between the first transmitter 120 and the processor 110. In certain aspects, the first transmitter 120 is configured to transmit signals via one or more of the first plurality of antennas 122-1 to 122-N using one or more wireless communication technologies, including, but not limited to, a third generation (3G) technology (e.g., CDMA), a fourth generation (4G) technology (also known as Long Term Evolution (LTE)), a fifth generation (5G) technology, one or more technologies based on one or more IEEE 802.11 protocols (e.g., IEEE 802.11ac, IEEE 802.11n, IEEE 802.11ad, IEEE 802.11ax, IEEE 802.11ay, etc.), and/or one or more other technologies. In some aspects, the first transmitter 120 may be configured to transmit signals via multiple antennas 122-1 to 122-N using multiple-input-multiple-output (MIMO) transmission to increase the capacity of a radio link between the wireless device 100 and another wireless device (not shown). In some aspects, the first transmitter 120 may be configured to transmit signals via multiple antennas 122-1 to 122-N using beamforming to direct transmissions toward another wireless device (not shown). In these aspects, the transmissions may be electrically steered by adjusting the relative phases and/or amplitudes of the transmit signals for the different antennas 122-1 to 122-N.

The processor 110 interfaces with the first transmitter 120 via the first bus 140. The first bus 140 may include one or more signal lines between the processor 110 and the first transmitter 120. To transmit data, the processor 110 may process the data into one or more signals (e.g., baseband signals or intermediate-frequency signals). The processing performed by the processor 110 may include coding the data and modulating the coded data (e.g., using any one of a variety of different modulation schemes, including BPSK, QPSK, QAM, etc.). The processor 110 may output the one or more signals to the first transmitter 120 via the first bus 140. The first transmitter 120 may then process the one or more signals from the processor 110 into one or more RF signals for transmission via one or more of the antennas 122-1 to 122-N. The processing performed by the first transmitter 120 may include frequency up-conversion, power amplification, etc.

In certain aspects, the processor 110 may adjust the transmission power for one or more of the antennas 122-1 to 122-N. For example, the first transmitter 120 may include multiple amplifiers (not shown) where each of the amplifiers is coupled to a respective one of the antennas. For each amplifier, the processor 110 may output a respective control signal to the amplifier via the first bus 140 to control the gain of the amplifier. In this example, the processor 110 may adjust the transmission power for an antenna by adjusting the gain of the respective amplifier accordingly. In another example, the processor 110 may output one or more signals to the first transmitter 120 where each of the one or more signals corresponds to a respective one of the antennas 122-1 to 122-N. In this example, the processor 110 may adjust the transmission power for an antenna by adjusting the amplitude of the respective signal accordingly. It is to be appreciated that the present disclosure is not limited to the above examples, and that the processor 110 may employ other techniques to adjust transmission power.

In certain aspects, the processor 110 may adjust transmission power for one or more of the antennas 122-1 to 122-N using an open power control loop and/or a closed power control loop. For the example of an open power control loop, the wireless device 100 may receive a pilot signal from another wireless device (not shown) via a receiver (not shown). In this example, the processor 110 estimates channel conditions between the wireless device 100 and the other wireless device based on the received pilot signal, and adjusts the transmission power for one or more of the antennas 122-1 to 122-N based on the estimated channel conditions. For the example of a closed power control loop, the wireless device 100 receives a feedback signal from the other wireless device via a receiver (not shown), in which the feedback signal indicates channel conditions between the wireless device 100 and the other wireless device. In this example, the processor 110 adjusts the transmission power for one or more of the antennas 122-1 to 122-N based on the indicated channel conditions.

The processor 110 may also adjust transmission power for one or more of the antennas 122-1 to 122-N based on data rate. For example, the processer 110 may increase (boost) the transmission power to transmit a short data burst.

Further, the processor 110 may adjust transmission power for one or more of the antennas 122-1 to 122-N to keep RF exposure from the wireless device 100 within an RF exposure limit set by a regulator (e.g., FCC), as discussed further below. In this case, the transmission power is constrained by the RF exposure limit.

The wireless device 100 also includes a second transmitter 130, a second plurality of antennas 132-1 to 132-M coupled to the second transmitter 130, and a second bus 150 coupled between the second transmitter 130 and the processor 110. In certain aspects, the second transmitter 130 is configured to transmit signals via one or more of the second plurality of antennas 132-1 to 132-M using one or more wireless communication technologies, including, but not limited to, a 3G technology, a 4G technology, a 5G technology, one or more technologies based on one or more IEEE 802.11 protocols (e.g., IEEE 802.11ac, IEEE 802.11n, IEEE 802.11ad, IEEE 802.11ax, IEEE 802.11ay, etc.), and/ or one or more other technologies. The second transmitter 130 may transmit signals via multiple antennas 132-1 to 132-M using MIMO transmission, beamforming, and/or other method. In certain aspects, the first transmitter 120 and the second transmitter 130 may simultaneously transmit signals using different wireless communication technologies, as discussed further below.

The processor 110 interfaces with the second transmitter 130 via the second bus 150, which may include one or more signal lines between the processor 110 and the second transmitter 130. To transmit data, the processor 110 may process the data into one or more signals (e.g., baseband signals or intermediate-frequency signals). The processing performed by the processor 110 may include coding the data and modulating the coded data (e.g., using any one of a variety of different modulation schemes, including BPSK, QPSK, QAM, etc.). The processor 110 may output the one or more signals to the second transmitter 130 via the second bus 150. The second transmitter 130 may then process the one or more signals from the processor 110 into one or more RF signals for transmission via one or more of the antennas 132-1 to 132-M. The processing performed by the second transmitter 130 may include frequency up-conversion, power amplification, etc.

The processor 110 may adjust the transmission power for one or more of the antennas 132-1 to 132-M. For example, the second transmitter 130 may include multiple amplifiers (not shown) where each of the amplifiers is coupled to a respective one of the antennas 132-1 to 132-M. For each amplifier, the processor 110 may output a respective control signal to the amplifier via the second bus 150 to control the gain of the amplifier. In this example, the processor 110 may adjust the transmission power for an antenna by adjusting the gain of the respective amplifier accordingly. In another example, the processor 110 may output one or more signals to the second transmitter 130 where each of the one or more signals corresponds to a respective one of the antennas 132-1 to 132-M. In this example, the processor 110 may adjust the transmission power for an antenna by adjusting the amplitude of the respective signal accordingly. It is to be appreciated that the present disclosure is not limited to the above examples, and that the processor 110 may employ other techniques to adjust transmission power.

The processor 110 may adjust transmission power for one or more of the antennas 132-1 to 132-M using an open power control loop and/or a closed power control loop, as discussed above. The processor 110 may also adjust transmission power for one or more of the antennas 132-1 to 132-M to keep RF exposure from the wireless device 100 within an RF exposure limit set by a regulator, as discussed further below.

It is to be appreciated that the wireless device 100 may include one or more additional transmitters in addition to the first and second transmitters 120 and 130 shown in FIG. 1. Although the first and second transmitters 120 and 130 are coupled to separate sets of antennas in the example shown in FIG. 1, it is to be appreciated that the first and second transmitters 120 and 130 may share one or more antennas. Also, in some implementations, the first transmitter 120 may transmit on only one antenna and/or the second transmitter 130 may transmit on only one antenna.

Modern wireless devices (e.g., cellular phones) are generally required to limit a user's exposure to radio frequency (RF) radiation according to exposure limits set by domestic and international regulators. RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm2.

SAR may be used to assess RF exposure for transmission frequencies less than 10 GHz, which cover wireless communication technologies such as 3G (e.g., CDMA), 4G, IEEE 802.11ac, etc. PD may be used to assess RF exposure for transmission frequencies higher than 10 GHz, which cover wireless communication technologies such as IEEE 802.11ad, 5G, etc. Thus, different metrics may be used to assess RF exposure for different wireless communication technologies.

The wireless device 100 may simultaneously transmit signals using multiple wireless communication technologies. For example, the wireless device 100 may simultaneously transmit signals using a first wireless communication technology operating below 10 GHz (e.g., 3G, 4G, etc.) and a second wireless communication technology operating above 10 GHz (e.g., 5G, IEEE 802.11ad). Since the wireless device 100 simultaneously transmits signals using the first and second technologies, the user of the device is exposed to RF radiation from transmissions using both technologies. Accordingly, techniques are needed for determining RF exposure compliance for cases where the wireless device 100 simultaneously transmits signals using multiple wireless communication technologies.

Aspects of the present disclosure enable the wireless device 100 to assess RF exposure in real time for cases where the wireless device 100 simultaneously transmits signals using multiple wireless communication technologies, as discussed further below.

In certain aspects, the wireless device 100 may simultaneously transmit signals using the first wireless communication technology (e.g., 3G, 4G, IEEE 802.11ac, etc.) in which RF exposure is measured in terms of SAR, and the second wireless communication technology (e.g., 5G, IEEE 802.11ad, etc.) in which RF exposure is measured in terms of PD. In these aspects, the first transmitter 120 may transmit first signals according to the first wireless communication technology, and the second transmitter 130 may transmit second signals according to the second wireless communication technology. When the wireless device 100 simultaneously transmits the first and second signals using the first and second technologies, respectively, the processor 110 may assess the combined RF exposure from the first and second technologies to ensure compliance with RF exposure limits, as discussed further below.

To assess RF exposure from transmissions using the first technology (e.g., 3G, 4G, IEEE 802.11ac, etc.), the wireless device 100 may include multiple SAR distributions for the first technology stored in the memory 115. Each of the SAR distributions may correspond to a respective one of multiple transmit scenarios supported by the wireless device 100 for the first technology. The transmit scenarios may correspond to various combinations of antennas 122-1 to 122-N, frequency bands, channels and/or body positions, as discussed further below.

The SAR distribution (also referred to as a SAR map) for each transmit scenario may be generated based on measurements (e.g., E-field measurements) performed in a test laboratory using a model of a human body. After the SAR distributions are generated, the SAR distributions are stored in the memory 115 to enable the processor 110 to assess RF exposure in real time, as discussed further below. Each SAR distribution includes a set of SAR values, where each SAR value may correspond to a different location (e.g., on the model of the human body). Each SAR value may comprise a SAR value averaged over a mass of 1 g or 10 g at the respective location.

The SAR values in each SAR distribution correspond to a particular transmission power level (e.g., the transmission power level at which the SAR values were measured in the test laboratory). Since SAR scales with transmission power level, the processor 110 may scale a SAR distribution for any transmission power level by multiplying each SAR value in the SAR distribution by the following transmission power scaler:

$$\frac{Tx_c}{Tx_{SAR}} \qquad (1)$$

where $Tx_c$ is a current transmission power level for the respective transmit scenario, and $Tx_{SAR}$ is the transmission power level corresponding to the SAR values in the stored SAR distribution (e.g., the transmission power level at which the SAR values were measured in the test laboratory).

As discussed above, the wireless device 100 may support multiple transmit scenarios for the first technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless device 100 relative to the user's body location (head, trunk, away from the body, etc.), and/or other parameters. In cases where the wireless device 100 supports a large number of transmit scenarios, it may be very time-consuming and expensive to perform measurements for each transmit scenario in a test setting (e.g., test laboratory). To reduce test time, measurements may be performed for a subset of the transmit scenarios to generate SAR distributions for the subset of transmit scenarios. In this example, the SAR distribution for each of the remaining transmit scenarios may be generated by combining two or more of the SAR distributions for the subset of transmit scenarios, as discussed further below.

For example, SAR measurements may be performed for each one of the antennas 122-1 to 122-N to generate a SAR distribution for each one of the antennas 122-1 to 122-N. In this example, a SAR distribution for a transmit scenario in which two or more of the antennas 122-1 to 122-N are active may be generated by combining the SAR distributions for the two or more active antennas.

In another example, SAR measurements may be performed for each one of multiple frequency bands to generate a SAR distribution for each one of the multiple frequency bands. In this example, a SAR distribution for a transmit scenario in which two or more frequency bands are active may be generated by combining the SAR distributions for the two or more active frequency bands.

In certain aspects, a SAR distribution may be normalized with respect to an SAR limit by dividing each SAR value in the SAR distribution by the SAR limit. In this case, a normalized SAR value exceeds the SAR limit when the normalized SAR value is greater than one, and is below the SAR limit when the normalized SAR value is less than one. In these aspects, each of the SAR distributions stored in the memory 115 may be normalized with respect to a SAR limit.

In certain aspects, the normalized SAR distribution for a transmit scenario may be generated by combining two or more normalized SAR distributions. For example, a normalized SAR distribution for a transmit scenario in which two or more antennas are active may be generated by combining the normalized SAR distributions for the two or more active antennas. For the case in which different transmission power levels are used for the active antennas, the normalized SAR distribution for each active antenna may be scaled by the respective transmission power level before combining the normalized SAR distributions for the active antennas. The normalized SAR distribution for simultaneous transmission from multiple active antennas may be given by the following:

$$SAR_{norm\_combined} = \sum_{i=1}^{i=K} \frac{Tx_i}{Tx_{SARi}} \cdot \frac{SAR_i}{SAR_{lim}} \quad (2)$$

where $SAR_{lim}$ is a SAR limit, $SAR_{norm\_combined}$ is the combined normalized SAR distribution for simultaneous transmission from the active antennas, i is an index for the active antennas, $SAR_i$ is the SAR distribution for the $i^{th}$ active antenna, $Tx_i$ is the transmission power level for the $i^{th}$ active antenna, $Tx_{SARi}$ is the transmission power level for the SAR distribution for the $i^{th}$ active antenna, and K is the number of the active antennas. Equation (2) may be rewritten as follows:

$$SAR_{norm\_combined} \sum_{i=1}^{i=K} \frac{Tx_i}{Tx_{SARi}} \cdot SAR_{norm\_i} \quad (3a)$$

where $SAR_{norm\_i}$ is the normalized SAR distribution for the $i^{th}$ active antenna. In the case of simultaneous transmissions using multiple active antennas at the same transmitting frequency (e.g., multiple in multiple out (MIMO)), the combined normalized SAR distribution is obtained by summing the square root of the individual normalized SAR distributions and computing the square of the sum, as given by the following:

$$SAR_{norm\_combined\_MIMO} = \left[ \sum_{i=1}^{i=K} \frac{Tx_i}{Tx_{SARi}} \cdot SAR_{norm\_i} \right]^2. \quad (3b)$$

In another example, normalized SAR distributions for different frequency bands may be stored in the memory 115. In this example, a normalized SAR distribution for a transmit scenario in which two or more frequency bands are active may be generated by combining the normalized SAR distributions for the two or more active frequency bands. For the case where the transmission power levels are different for the active frequency bands, the normalized SAR distribution for each of the active frequency bands may be scaled by the respective transmission power level before combining the normalized SAR distributions for the active frequency bands. In this example, the combined SAR distribution may also be computed using equation (3a) in which i is an index for the active frequency bands, $SAR_{norm\_i}$ is the normalized SAR distribution for the $i^{th}$ active frequency band, $Tx_i$ is the transmission power level for the $i^{th}$ active frequency band, and $Tx_{SARi}$ is the transmission power level for the normalized SAR distribution for the $i^{th}$ active frequency band.

To assess RF exposure from transmissions using the second technology (e.g., 5G, IEEE 802.11ad, etc.), the wireless device 100 may include multiple PD distributions for the second technology stored in the memory 115. Each of the PD distributions may correspond to a respective one of multiple transmit scenarios supported by the wireless device 100 for the second technology. The transmit scenarios may correspond to various combinations of antennas 132-1 to 132-M, frequency bands, channels and/or body positions, as discussed further below.

The PD distribution (also referred to as PD map) for each transmit scenario may be generated based on measurements (e.g., E-field measurements) performed in a test laboratory using a model of a human body. After the PD distributions are generated, the PD distributions are stored in the memory 115 to enable the processor 110 to assess RF exposure in real time, as discussed further below. Each PD distribution includes a set of PD values, where each PD value may correspond to a different location (e.g., on the model of the human body).

The PD values in each PD distribution correspond to a particular transmission power level (e.g., the transmission power level at which the PD values were measured in the test laboratory). Since PD scales with transmission power level, the processor 110 may scale a PD distribution for any transmission power level by multiplying each PD value in the PD distribution by the following transmission power scaler:

$$\frac{Tx_c}{Tx_{PD}} \quad (4)$$

where $Tx_c$ is a current transmission power level for the respective transmit scenario, and $T_{XPD}$ is the transmission power level corresponding to the PD values in the PD distribution (e.g., the transmission power level at which the PD values were measured in the test laboratory).

As discussed above, the wireless device 100 may support multiple transmit scenarios for the second technology. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless device 100 relative to the user's body location (head, trunk, away from the body, etc.), and/or other parameters. In cases where the wireless device 100 supports a large number of transmit scenarios, it may be very time-consuming and expensive to perform measurements for each transmit scenario in a test setting (e.g., test laboratory). To reduce test time, measurements may be performed for a subset of the transmit scenarios to generate PD distributions for the subset of transmit scenarios. In this example, the PD distribution for each of the remaining transmit scenarios may be generated by combining two or more of the PD distributions for the subset of transmit scenarios, as discussed further below.

For example, PD measurements may be performed for each one of the antennas 132-1 to 132-M to generate a PD distribution for each one of the antennas 132-1 to 132-M. In this example, a PD distribution for a transmit scenario in which two or more of the antennas 132-1 to 132-M are active may be generated by combining the PD distributions for the two or more active antennas.

In another example, PD measurements may be performed for each one of multiple frequency bands to generate a PD distribution for each one of the multiple frequency bands. In this example, a PD distribution for a transmit scenario in which two or more frequency bands are active may be generated by combining the PD distributions for the two or more active frequency bands.

In certain aspects, a PD distribution may be normalized with respect to a PD limit by dividing each PD value in the PD distribution by the PD limit. In this case, a normalized PD value exceeds the PD limit when the normalized PD value is greater than one, and is below the PD limit when the normalized PD value is less than one. In these aspects, each of the PD distributions stored in the memory 115 may be normalized with respect to a PD limit.

In certain aspects, the normalized PD distribution for a transmit scenario may be generated by combining two or more normalized PD distributions. For example, a normalized PD distribution for a transmit scenario in which two or more antennas are active may be generated by combining the normalized PD distributions for the two or more active antennas. For the case in which different transmission power levels are used for the active antennas, the normalized PD distribution for each active antenna may be scaled by the respective transmission power level before combining the normalized PD distributions for the active antennas. The normalized PD distribution for simultaneous transmission from multiple active antennas may be given by the following:

$$PD_{norm\_combined} = \sum_{i=1}^{i=L} \frac{Tx_i}{Tx_{PDi}} \cdot \frac{PD_i}{PD_{lim}} \quad (5)$$

where $PD_{lim}$ is a PD limit, $PD_{norm\_combined}$ is the combined normalized PD distribution for simultaneous transmission from the active antennas, i is an index for the active antennas, $PD_i$ is the PD distribution for the $i^{th}$ active antenna, $Tx_i$ is the transmission power level for the $i^{th}$ active antenna, $T_{XPDi}$ is the transmission power level for the PD distribution for the $i^{th}$ active antenna, and L is the number of the active antennas. Equation (5) may be rewritten as follows:

$$PD_{norm\_combined} = \sum_{i=1}^{i=L} \frac{Tx_i}{Tx_{PDi}} \cdot PD_{norm\_i} \quad (6a)$$

where $PD_{norm\_i}$ is the normalized PD distribution for the $i^{th}$ active antenna. In the case of simultaneous transmissions using multiple active antennas at the same transmitting frequency (e.g., MIMO), the combined normalized PD distribution is obtained by summing the square root of the individual normalized PD distributions and computing the square of the sum, as given by the following:

$$PD_{norm\_combined\_MIMO} = \left[\sum_{i=1}^{i=L} \sqrt{\frac{Tx_i}{Tx_{PDi}} \cdot PD_{norm\_i}}\right]^2. \quad (6b)$$

In another example, normalized PD distributions for different frequency bands may be stored in the memory 115. In this example, a normalized PD distribution for a transmit scenario in which two or more frequency bands are active may be generated by combining the normalized PD distributions for the two or more active frequency bands. For the case where the transmission power levels are different for the active frequency bands, the normalized PD distribution for each of the active frequency bands may be scaled by the respective transmission power level before combining the normalized PD distributions for the active frequency bands. In this example, the combined PD distribution may also be computed using equation (6a) in which i is an index for the active frequency bands, $PD_{norm\_i}$ is the normalized PD distribution for the $i^{th}$ active frequency band, $Tx_i$ is the transmission power level for the $i^{th}$ active frequency band, and $TX_{PDi}$ is the transmission power level for the normalized PD distribution for the $i^{th}$ active frequency band.

As discussed above, the wireless device 100 may simultaneously transmit signals using the first technology (e.g., 3G, 4G, IEEE 802.11ac, etc.) and the second technology (e.g., 5G, IEEE 802.11ad, etc.), in which RF exposure is measured using different metrics for the first technology and the second technology (e.g., SAR for the first technology and PD for the second technology). In this case, the processor 110 may determine a first maximum allowable power level for the first technology and a second maximum allowable power level for the second technology for transmissions in a future time slot that comply with RF exposure limits. During the future time slot, the transmission power levels for the first and second technologies are constrained (i.e., bounded) by the determined first and second maximum allowable power levels, respectively, to ensure compliance with RF exposure limits, as further below. In the present disclosure, the term "maximum allowable power level" refers to a "maximum allowable power level" imposed by an RF exposure limit unless stated otherwise. It is to be appreciated that the "maximum allowable power level" is not necessarily equal to the absolute maximum power level that complies with an RF exposure limit and may be less than the absolute maximum power level that complies with the RF exposure limit (e.g., to provide a safety margin). The "maximum allowable power level" may be used to set a power level limit on a transmission at a transmitter such that the power level of the transmission is not allowed to exceed the "maximum allowable power level" to ensure RF exposure compliance.

The processor 110 may determine the first and second maximum allowable power levels as follows. The processor may determine a normalized SAR distribution for the first technology at a first transmission power level, determine a normalized PD distribution for the second technology at a second transmission power level, and combine the normalized SAR distribution and the normalized PD distribution to generate a combined normalized RF exposure distribution (referred to simply as a combined normalized distribution below). The value at each location in the combined normalized distribution may be determined by combining the normalized SAR value at the location with the normalized PD value at the location or another technique.

The processor 110 may then determine whether the first and second transmission power levels comply with RF exposure limits by comparing the peak value in the combined normalized distribution with one. If the peak value is equal to or less than one (i.e., satisfies the condition≤1), then the processor 110 may determine that the first and second transmission power levels comply with RF exposure limits (e.g., SAR limit and PD limit) and use the first and second transmission power levels as the first and second maximum allowable power levels, respectively, during the future time slot. If the peak value is greater than one, then the processor 110 may determine that the first and second transmission power levels do not comply with RF exposure limits. To avoid non-compliance during the future time slot, the processor 110 may reduce one or more of the first and second transmission power levels so that the peak value in the combined normalized distribution is equal to or less than one. In this case, the processor 110 may use the first and second transmission power levels that comply with the RF exposure limits as the first and second maximum allowable power levels, respectively, during the future time slot. The condition for RF exposure compliance for simultaneous transmissions using the first and second technologies may be given by:

$$\text{SAR}_{norm} + \text{PD}_{norm} \leq 1 \tag{7}$$

During the future time slot, the processor 110 limits (constrains) the transmission power level of the first transmitter 120 by the first maximum allowable power level. For example, if a power control loop is used for the first technology, the power control loop is allowed to set the transmission power level of the first transmitter 120 to a power level equal to or below the first maximum allowable power level, but not a power level exceeding the first maximum allowable power level. During the future time slot, the processor 110 also limits (constrains) the transmission power level of the second transmitter 130 by the second maximum allowable power level. For example, if a power control loop is used for the second technology, the power control loop is allowed to set the transmission power level of the second transmitter 130 to a power level equal to or below the second maximum allowable power level, but not a power level exceeding the second maximum allowable power level.

Figures 2, 3:
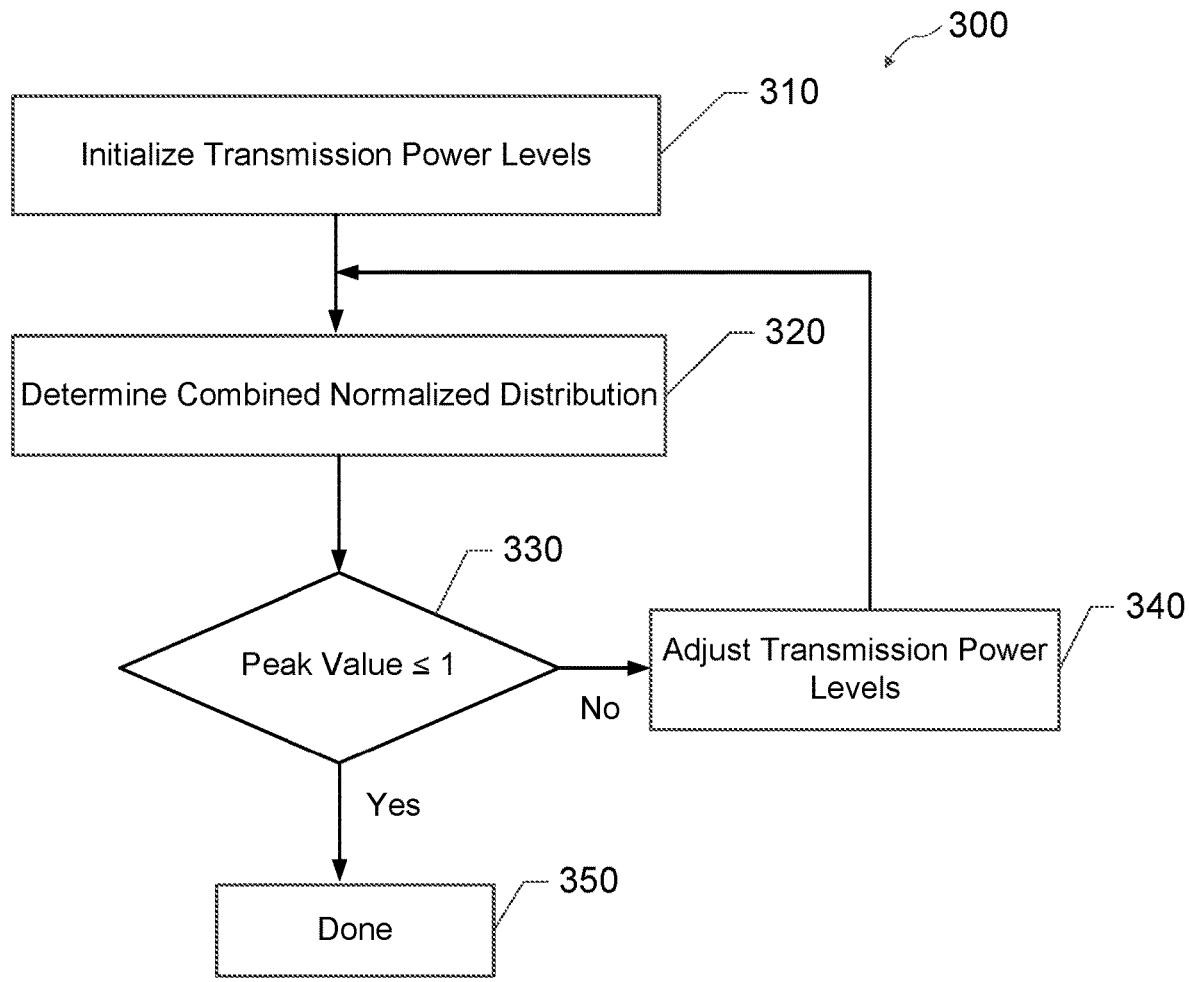
FIG. 2 shows an example of a normalized specific absorption rate (SAR) distribution combined with a normalized power density (PD) distribution according to certain aspects of the present disclosure.
FIG. 3 is a flowchart illustrating an exemplary method for determining transmission power levels that comply with RF exposure limits for simultaneous transmissions using multiple wireless communication technologies according to certain aspects of the present disclosure.

FIG. 2 shows a visually representation of the normalized SAR distribution 210 and the normalized PD distribution 220, in which the normalized SAR distribution 210 and the normalized PD distribution 220 are combined to generate a combined normalized distribution 230. FIG. 2 also shows the condition that the peak value in the combined normalized distribution 230 be equal to or less than one for RF exposure compliance. Although each of the distributions 210, 220 and 230 is depicted as a two-dimensional distribution in FIG. 2, it is to be appreciated that the present disclosure is not limited to this example.

The normalized SAR distribution in equation (7) may be generated by combining two or more normalized SAR distributions as discussed above (e.g., for a transmit scenario using multiple active antennas). Similarly, the normalized PD distribution in equation (7) may be generated by combining two or more normalized PD distributions as discussed above (e.g., for a transmit scenario using multiple active antennas). In this case, the condition for RF exposure compliance in equation (7) may be rewritten using equations (3a) and (6a) as follows:

$$\sum_{i=1}^{i=K} \frac{Tx_i}{Tx_{SARi}} \cdot SAR_{norm\_i} + \sum_{i=1}^{i=L} \frac{Tx_i}{Tx_{PDi}} \cdot PD_{norm\_i} \leq 1. \tag{8}$$

For the MIMO case, equations (3b) and (6b) may be combined instead. As shown in equation (8), the combined normalized distribution may be a function of transmission power levels for the first technology and transmission power levels for the second technology. All the points in the combined normalized distribution should meet the normalized limit of one in equation (8). Additionally, when combining SAR and PD distributions, the SAR and PD distributions should be aligned spatially or aligned with their peak locations so that the combined distribution given by equation (8) represents combined RF exposure for a given position of a human body.

For the case in which the wireless device 100 simultaneously transmits signals using the first and second technologies, the processor 110 may determine one or more maximum allowable power levels for the first technology and one or more maximum allowable power levels for the second technology for transmissions in a future time slot as follows. The processor 110 retrieves one or more normalized SAR distributions for the first technology from the memory 115 based on a transmit scenario for the first technology in the future time slot and retrieves one or more normalized PD distributions for the second technology from the memory 115 based on a transmit scenario for the second technology in the future time slot. For example, if the transmit scenario for the first technology uses multiple active antennas, then the processor 110 may retrieve a normalized SAR distribution for each of the active antennas. Similarly, if the transmit scenario for the second technology uses multiple active antennas, then the processor 110 may retrieve a normalized PD distribution for each of the active antennas.

The processor 110 may then determine maximum allowable power levels for the first and second technologies that comply with the RF exposure limits (e.g., SAR limit and PD limit) by performing the exemplary method illustrated in FIG. 3.

At block 310, the processor 110 initializes the transmission power levels for the first and second technologies according to the transmit scenarios for the first and second technologies in the future time slot. If the transmit scenario for the first technology uses multiple active antennas, then the transmission power levels may include a transmission power level for each of the active antennas for the first technology. Similarly, if the transmit scenario for the second technology uses multiple active antennas, then the transmission power levels may include a transmission power level for each of the active antennas for the second technology.

The transmission power levels for the first and second technologies may be initialized according to one or more power control loops, one or more desired data rates, one or more desired beam directions or sectors, etc. In one example, the transmission power levels may be initialized to a set of default transmission power levels.

At block 320, the processor 110 determines a combined normalized distribution based on the transmission power levels in block 310, the retrieved normalized SAR distributions, and the retrieved normalized PD distributions (e.g., according to equation (8) discussed above).

At block 330, the processor 110 compares the peak value in the combined normalized distribution with one. If the peak value in the combined normalized distribution is equal to or less than one (i.e., satisfies the condition 1), then the processor 110 determines that the transmission power levels comply with RF exposure limits. In this case, the method 300 ends at block 350, and the processor 110 uses the transmission power levels as the maximum allowable power levels for the future time slot.

If the peak value in the combined normalized distribution is greater than one, then the processor 110 adjusts the transmission power levels at block 340. For example, the processor 110 may adjust the transmission power levels by reducing one or more of the transmission power levels.

The processor 110 then repeats block 320 and 330 using the adjusted transmission power levels (i.e., determines the combined normalized distribution in block 320 using the adjusted transmission power levels). The processor 110 may repeat block 340, 320 and 330 until the peak value in the combined normalized distribution is equal or less than one, at which point the transmission power levels comply with RF exposure limits. The transmission power levels that comply with the RF exposure limits are then used as the maximum allowable power levels for the future time slot. The maximum allowable power levels include one or more maximum allowable power levels for the first technology and one or more maximum allowable power levels for the second technology. For the example in which multiple active antennas (e.g., two or more of antennas 122-1 to 122-N) are used for the first technology, the maximum allowable power levels include a maximum allowable power level for each of the active antennas. For the example in which multiple active antennas (e.g., two or more of antennas 132-1 to 132-M) are used for the second technology, the maximum allowable power levels include a maximum allowable power level for each of the active antennas.

After the processor 110 determines the maximum allowable power levels, the processor 110 constrains transmission power of the first transmitter 120 during the future time slot by the one or more determined maximum allowable power levels for the first technology. For the example in which the first transmitter 120 transmits signals using multiple antennas (e.g., two or more of antennas 122-1 to 122-N) during the future time slot, the maximum allowable power levels include a maximum allowable power level for each of the active antennas. In this example, the processor 110 constrains the transmission power level for each of the active antennas by the respective maximum allowable power level. The processor 110 also constrains transmission power of the second transmitter 130 during the future time slot by the one or more determined maximum allowable power levels for the second technology. For the example in which the second transmitter 130 transmits signals using multiple antennas (e.g., two or more of antennas 132-1 to 132-M) during the future time slot, the maximum allowable power levels include a maximum allowable power level for each of the active antennas. In this example, the processor 110 constrains the transmission power level for each of the active antennas by the respective maximum allowable power level.

It is to be appreciated that the present disclosure is not limited to the exemplary method 300 illustrated in FIG. 3, and that other methods may be employed to determine maximum allowable power levels for the first and second technologies that comply with the RF exposure limits. For example, the processor 110 may determine maximum allowable power levels that result in the peak value in the combined normalized distribution being equal to or less than a value that is less than one for a conservative approximate analysis to determine the maximum allowable power levels with fewer computations. Thus, a value of less than one may be used as the condition for assessing RF exposure compliance.

In some cases, the wireless device 100 may transmit signals using the second technology (e.g., 5G, IEEE 802.11ad, etc.) when the first technology is not active. In these cases, RF exposure from the first technology does not need to be considered to assess RF exposure compliance.

In these cases, the processor 110 may determine maximum allowable power levels for the second technology in a future time slot that comply with a PD limit as follows. First, the processor 110 may retrieve normalized PD distributions for the second technology from the memory 115 based on a transmit scenario for the second technology in the future time slot. For example, if the transmit scenario for the second technology in the future time slot uses multiple active antennas, then the processor 110 may retrieve a normalized PD distribution for each of the active antennas. In this example, the active antennas may be selected, e.g., based on a desired beam direction or sector for transmission by the wireless device 100 in the future time slot.

Figure 4:
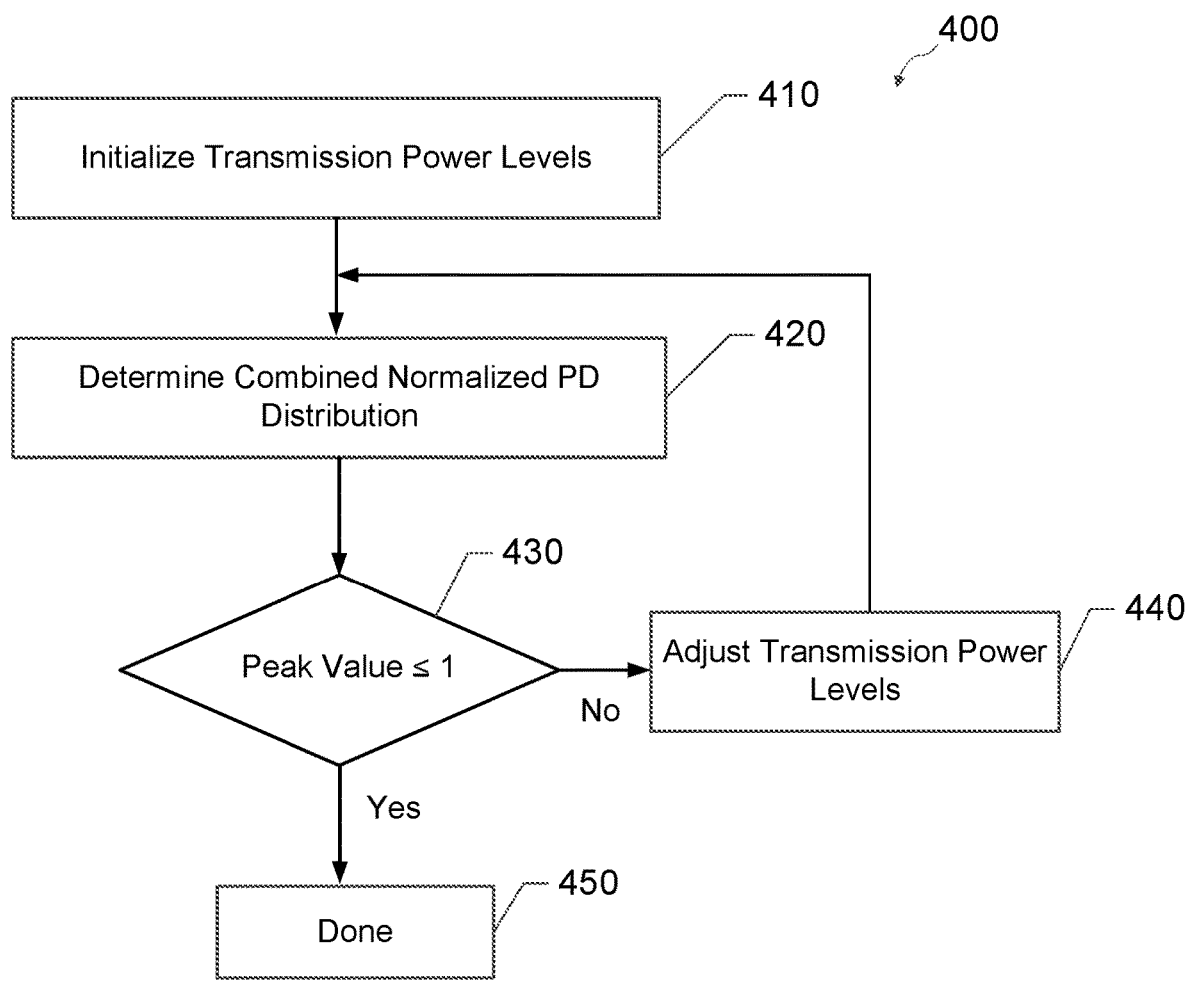
FIG. 4 is a flowchart illustrating an exemplary method for determining transmission power levels that comply with a PD limit according to certain aspects of the present disclosure.

The processor 110 may then determine maximum allowable power levels for the second technology that comply with the PD limit by performing the exemplary method illustrated in FIG. 4.

At block 410, the processor 110 initializes the transmission power levels for the second technology according to the transmit scenario for the second technology. If the transmit scenario for the second technology uses multiple active antennas, then the transmission power levels may include a transmission power level for each of the active antennas. The transmission power levels may be initialized according to a power control loop, a desired data rate, a desired beam direction or sector, etc. In one example, the transmission power levels may be initialized to a set of default transmission power levels.

At block 420, the processor 110 determines a combined normalized PD distribution based on the transmission power levels in block 410, and the retrieved normalized PD distributions (e.g., according to equation (6a) or (6b) discussed above).

At block 430, the processor 110 compares the peak value in the combined normalized PD distribution with one. If the peak value in the combined normalized PD distribution is equal to or less than one (i.e., satisfies the condition 1), then the processor 110 determines that the transmission power levels comply with the PD limit. In this case, the method 400 ends at block 450, and the processor 110 uses the transmission power levels as the maximum allowable power levels for the second transmitter 130.

If the peak value in the combined normalized PD distribution is greater than one, then the processor 110 adjusts the transmission power levels at block 440. For example, the processor 110 may adjust the transmission power levels by reducing one or more of the transmission power levels initialized in block 410.

The processor 110 then repeats block 420 and 430 using the adjusted transmission power levels (i.e., determines the combined normalized PD distribution in block 420 using the adjusted transmission power levels). The processor 110 may repeat blocks 440, 420 and 430 until the peak value in the combined normalized PD distribution is equal or less than one, at which point the transmission power levels comply with the PD limit. The processor 110 then uses the transmission power levels that comply with the PD limit as the maximum allowable power levels for the second transmitter 130. After the processor 110 determines the maximum allowable power levels complying with the PD limit, the processor 110 constrains transmission power for the second transmitter 130 during the future time slot according to the determined maximum allowable power levels. For the example in which the second transmitter 130 transmits signals using multiple active antennas (e.g., two or more of antennas 132-1 to 132-M) during the future time slot, the maximum allowable power levels for the second technology include a maximum allowable power level for each of the active antennas. In this example, the processor 110 constrains the transmission power level for each of the active antennas by the respective maximum allowable power level.

It is to be appreciated that the present disclosure is not limited to the exemplary method 400 illustrated in FIG. 4, and that other methods may be employed to determine maximum allowable power levels that comply with the PD limit. For example, the processor 110 may determine maximum allowable power levels that that result in the peak value being equal to or less than a value that is less than one for a conservative approximate analysis to determine the maximum allowable power levels with fewer computations.

In certain cases, an RF exposure regulation requires that a time-averaged RF exposure over a time window not exceed an RF exposure limit. This allows the wireless device 100 to briefly exceed the RF exposure limit as long as the time-averaged RF exposure does not exceed the limit.

In this regard, the processor 110 may determine RF exposure compliance for the case in which the first technology is active and the second technology is not active as follows. The processor 110 may compute a time-averaged normalized SAR distribution over a first time window (e.g., 6 minutes), and compare the peak value in the time-averaged normalized SAR distribution with one to assess RF exposure compliance. If the peak value is equal to or less than one (i.e., satisfies the condition 1), then the processor 110 may determine RF exposure compliance.

Figure 5:
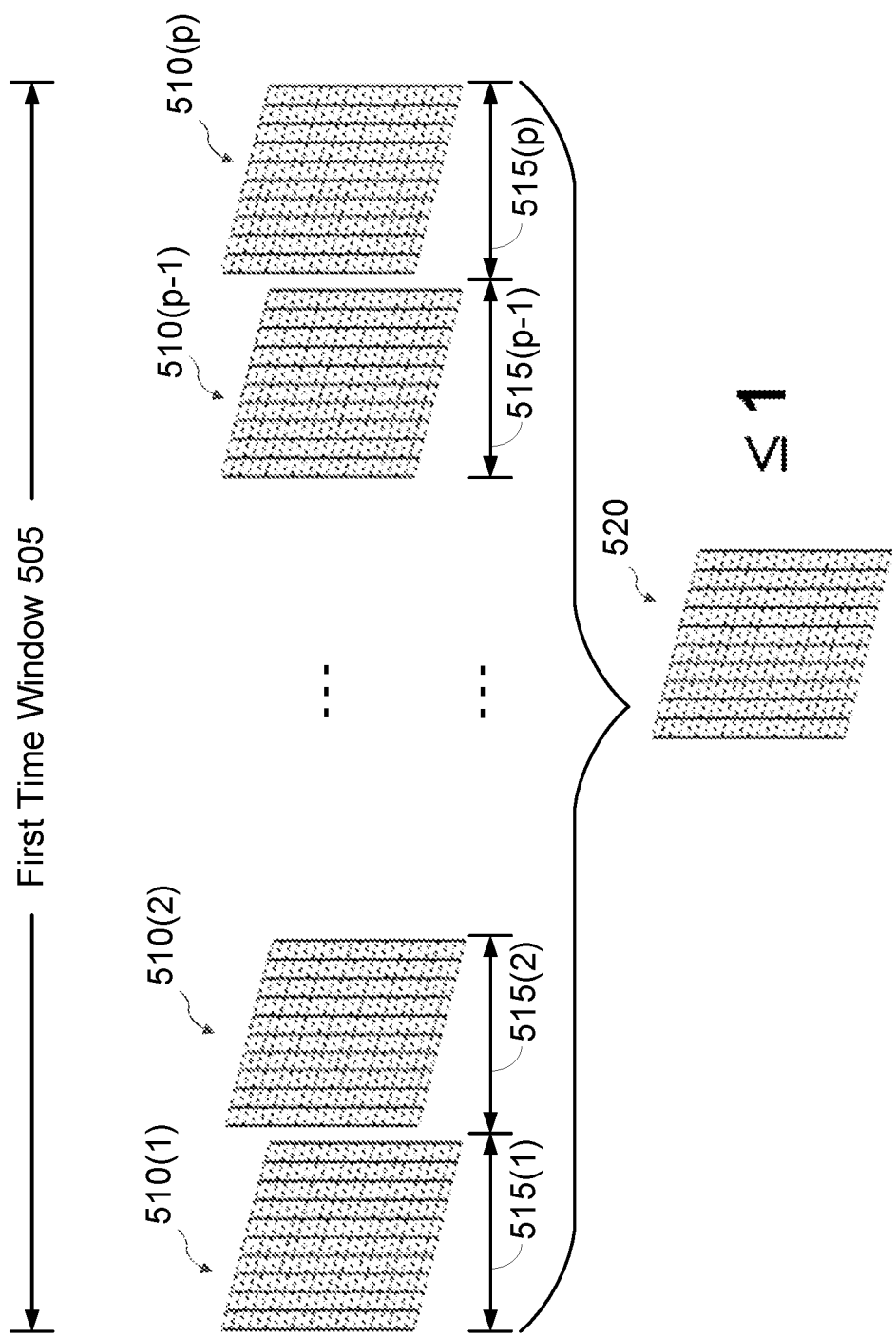
FIG. 5 shows an example of a time-averaged SAR distribution according to certain aspects of the present disclosure.

In this regard, FIG. 5 illustrates an example in which the processor 110 computes a time-averaged normalized SAR distribution over a first time window 505 (e.g., 6 minutes). In this example, the first time window 505 is divided into multiple time slots (i.e., time intervals). For instance, a 6-minute time window may be divided into 5-second time slots. In the example shown in FIG. 5, there are p number of time slots 515(1)-515(p), and p number of normalized SAR distributions 510(1)-510(p). Although each of the distributions 510(1)-510(p) is depicted as a two-dimensional distribution in FIG. 5, it is to be appreciated that the present disclosure is not limited to this example.

The processor 110 may determine a normalized SAR distribution for each time slot (e.g., according to equation (3a) or (3b)). The normalized SAR distribution for a time slot may be generated by combining two or more SAR distributions. For example, if two or more antennas are active during the time slot, then the processor 110 may combine the normalized SAR distributions for the two or more active antennas to generate the normalized SAR distribution for the time slot. For the case in which different transmission power levels are used for the active antennas, the processor 110 may scale the normalized SAR distribution for each active antenna by the transmission power level for the antenna.

In certain aspects, the transmit scenario and/or transmission power levels for the first technology may vary over the first time window 505. In these aspects, the transmit scenario may be approximately constant over one time slot, but may vary from time slot to time slot within the first time window 505. The processor 110 may determine the normalized SAR distribution for each time slot based on the transmit scenario and time-averaged transmission power levels for the time slot (e.g., according to equation (3a) or 3(b)).

The processor 110 may average the normalized SAR distributions 510(1)-510(p) over the first time window 505 to generate a time-averaged normalized SAR distribution 520. For example, the processor 110 may compute the time-averaged normalized SAR distribution 520 by combining the normalized SAR distributions 510(1)-510(p) for the time slots 515(1)-515(p) and dividing the resulting combined normalized SAR distribution by the number of time slots as given by the following:

$$\frac{1}{p}\sum_{j=1}^{j=p} SAR_{norm\_j} \leq 1 \qquad (9a)$$

where $SAR_{norm\_j}$ represents the normalized SAR distribution for the $j^{th}$ time slot 510(j). As discussed above, the normalized SAR distribution for a time slot may be a combination of multiple SAR distributions for the time slot (e.g., for the case of multiple active antennas). The processor 110 may then compare the peak value in the time-averaged normalized SAR distribution 520 with one to assess RF exposure compliance. If the peak value is equal to or less than one (i.e., satisfies the condition 1), then the processor 110 may determine RF exposure compliance.

In certain aspects, the processor 110 may determine maximum allowable power levels for a future time slot to ensure time-average RF exposure compliance. In this regard, the time slots 515(1)-515(p−1) in FIG. 5 may correspond to previous transmissions by the wireless device 100, and the time slot 515(p) may correspond to the future time slot. In this regard, the time slot 515(p) is referred to as the future time slot below. Equation (9a) may be written as follows:

$$\frac{1}{p}\left[\left(\sum_{j=1}^{j=p-1} SAR_{norm\_j}\right) + SAR_{norm\_p}\right] \leq 1 \quad (9b)$$

where $SAR_{norm\_p}$ is the SAR distribution for the future time slot 515(p).

In this example, it is assumed that the transmission power levels for the normalized SAR distributions 510(1)-510(p-1) are known by the processor 110 since they correspond to previous transmissions by the wireless device 100. For example, the processor 110 may record the transmission power levels and transmit scenario for each of the time slots 515(1)-515(p-1) in the memory 115, and use the recorded transmission power levels and transmit scenarios for the time slots 515(1)-515(p-1) to determine the normalized SAR distributions 510(1)-510(p-1) for these time slots. For time slots 515(1)-515(p-1), the normalized SAR distribution for the $j^{th}$ time slot 515(j) may be determined using equation (3a) or (3b) for all transmission scenarios and power levels that were active during the $j^{th}$ time slot 515(j).

In this example, the transmission power levels for the normalized SAR distribution 510(p) corresponding to the future time slot 515(p) are variables to be solved by the processor 110. To determine maximum allowable power levels for the future time slot 515(p), the processor 110 may compute the time-averaged normalized SAR distribution 520 in which the transmission power levels for the future time slot 515(p) are variables in the time-averaged normalized SAR distribution 520 (i.e., the time-averaged normalized SAR distribution is a function of the transmission power levels for the future time slot 515(p)). The processor 110 may then determine transmission power levels for the future time slot 515(p) such that the peak value in the time-averaged normalized SAR distribution is equal to or less than one (i.e., satisfies the condition 1 in equation (9b)). The processor 110 uses the transmission power levels that satisfy the condition for RF exposure compliance as the maximum allowable power levels for the future time slot 515(p), and sets the transmission power limits for the future time slot 515(p) according to the determined maximum allowable power levels. The processor 110 may determine the maximum allowable power levels for the future time slot 515(p) during time slot 515(p-1) so that the maximum allowable power levels for the future time slot 515(p) are ready at the start of the future time slot 515(p) for the processor 110 to enforce the maximum allowable power levels.

Figure 6:
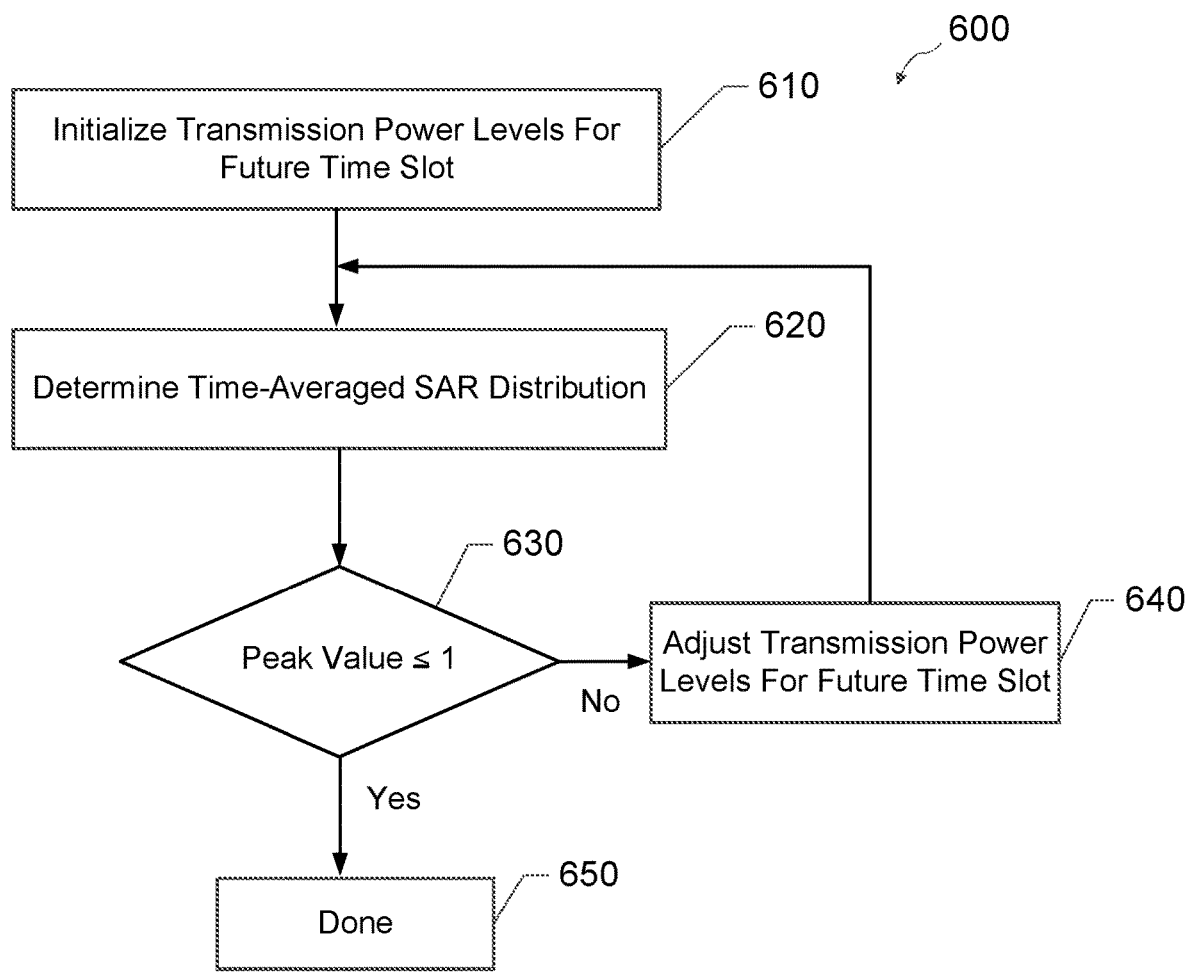
FIG. 6 is a flowchart illustrating an exemplary method for determining transmission power levels for a future time slot in compliance with a time-average SAR limit according to certain aspects of the present disclosure.

The processor 110 may determine the maximum allowable power levels for the future time slot 515(p) according to the exemplary method 600 illustrated in FIG. 6. At block 610, the processor 110 initializes the transmission power levels for the future time slot 515(p) according to the transmit scenario for the future time slot 515(p). The transmission power levels may be initialized according to a power control loop, a desired data rate, a desired beam direction or sector, etc. In one example, the transmission power levels may be initialized to a set of default transmission power levels.

At block 620, the processor 110 determines the time-averaged normalized SAR distribution based on the transmit scenario and transmission power levels at block 610 for the future time slot 515(p). Note that the transmission power levels for the previous time slots 515(1)-515(p-1) are known, as discussed above.

At block 630, the processor 110 compares the peak value in the time-averaged normalized SAR distribution with one to assess RF exposure compliance. If the peak value is equal to or less than one, then the method 600 ends at block 650. In this case, the processor 110 uses the transmission power levels initialized at block 610 as the maximum allowable power levels for the future time slot 515(p).

If the peak value is greater than one, then the processor 110 adjusts the transmission power levels for the future time slot at block 640. The processor 110 may adjust the transmission power levels for the future time slot by reducing one or more of the transmission power levels for the future time slot. The processor 110 then repeats blocks 620 and 630 using the adjusted transmission power levels. The processor 110 may repeat blocks 640, 620 and 630 until the peak value in the time-averaged normalized SAR distribution is equal or less than one, at which point the transmission power levels comply with the SAR limit and the processor 110 uses the transmission power levels that comply with the SAR limit as the maximum allowable power levels for the future time slot 515 (p).

For the example in which the first transmitter 120 transmits signals using multiple active antennas (e.g., two or more of antennas 122-1 to 122-N) during the future time slot 515(p), the maximum allowable power levels may include a maximum allowable power level for each of the active antennas. In this example, the processor 110 limits (constrains) the transmission power level for each of the active antennas by the respective maximum allowable power level.

It is to be appreciated that the present disclosure is not limited to the exemplary method 600 illustrated in FIG. 6, and that other methods may be employed to determine transmission power levels for the future time slot 515(p) such that the time-averaged normalized SAR distribution complies with the SAR limit. For example, the processor 110 may determine maximum allowable power levels that result in the peak value of the time-averaged normalized SAR distribution being equal to or less than a value that is less than one for a conservative approximate analysis to determine the maximum allowable power levels with fewer computations.

In certain cases, a regulator may require that a time-averaged PD distribution for the second technology not exceed a PD limit for the second technology. This allows the wireless device 100 to briefly exceed the PD limit as long as the time-averaged PD distribution does not exceed the PD limit.

In this regard, the processor 110 may determine RF exposure compliance for the case in which the second technology is active and the first technology is not active as follows. The processor 110 may compute a time-averaged normalized PD distribution over a second time window (e.g., 2 minutes), and compare the peak value in the time-averaged normalized PD distribution with one to assess RF exposure compliance. If the peak value is equal to or less than one (i.e., satisfies the condition 1), then the processor 110 may determine RF exposure compliance.

Figure 7:
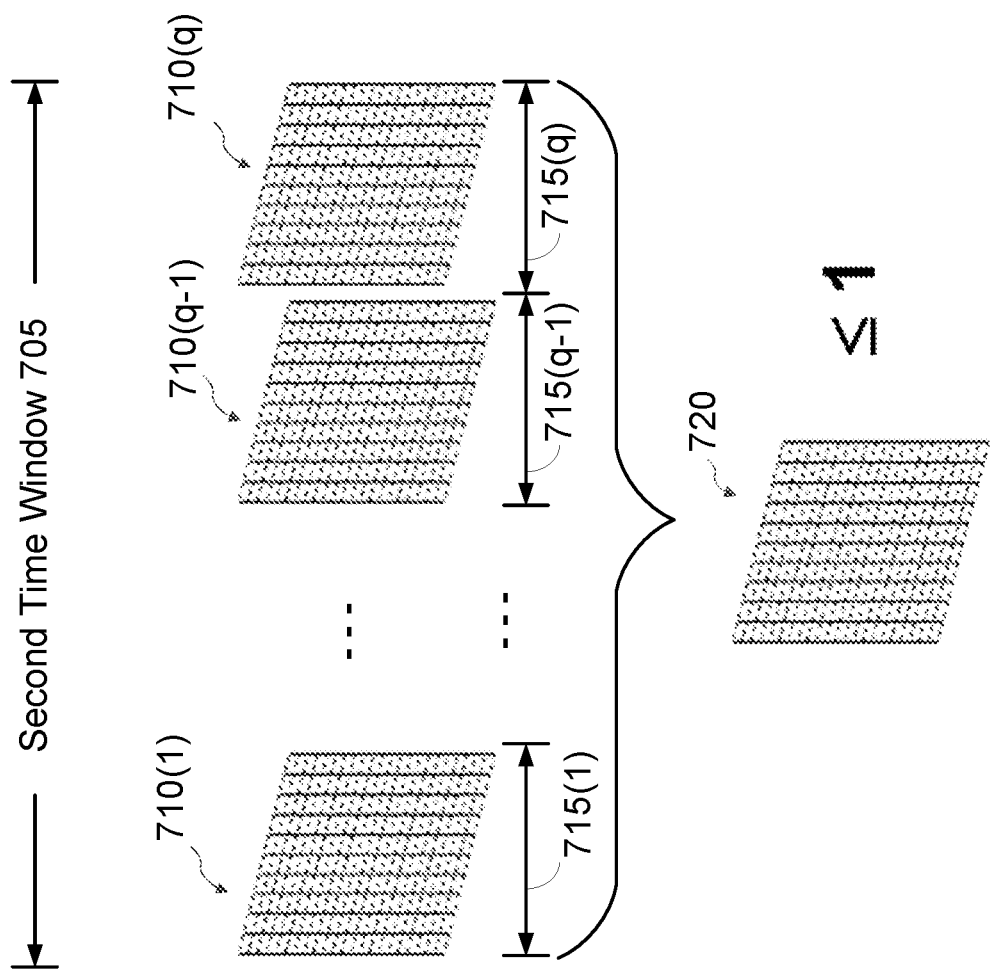
FIG. 7 shows an example of a time-averaged PD distribution according to certain aspects of the present disclosure.

In this regard, FIG. 7 illustrates an example in which the processor 110 computes a time-averaged normalized PD distribution over a second time window 705 (e.g., 2 minutes). In this example, the second time window 705 is divided into multiple time slots (i.e., time intervals). For instance, a 2-minute time window may be divided into 5-second time slots. In the example shown in FIG. 7, there are q number of time slots 715(1)-715(q), and q number of normalized PD distributions 710(1)-710(q). Although each of the distributions 710(1)-710(q) is depicted as a two-dimensional distribution in FIG. 7, it is to be appreciated that the present disclosure is not limited to this example.

The processor 110 may determine a normalized PD distribution for each time slot (e.g., according to equation (6a) or (6b)). The normalized PD distribution for a time slot may be generated by combining two or more PD distributions. For example, if two or more antennas are active during the time slot, then the processor 110 may combine the normalized PD distributions for the two or more active antennas to generate the normalized PD distribution for the time slot. For the case in which different transmission power levels are used for the active antennas, the processor 110 may scale the normalized PD distribution for each active antenna by the respective transmission power level.

In certain aspects, the transmit scenario and/or transmission power levels for the second technology may vary over the second time window 705. In these aspects, the transmit scenario may be approximately constant over one time slot, but may vary from time slot to time slot within the second time window 705. The processor 110 may determine the normalized PD distribution for each time slot based on the transmit scenario and time-averaged transmission power levels during the time slot (e.g., according to equation (6a) or (6b)).

The processor 110 may average the normalized PD distributions 710(1)-710(q) over the second time window 705 to generate a time-averaged normalized PD distribution 720. For example, the processor 110 may compute the time-averaged normalized PD distribution 720 by combining the normalized PD distributions 710(1)-710(q) for the time slots 715(1)-715(q) and dividing the resulting combined normalized PD distribution by the number of time slots as given by the following:

$$\frac{1}{q}\sum_{j=1}^{j=q} PD_{norm\_j} \leq 1 \quad (10a)$$

where $PD_{nom\_j}$ represents the normalized PD distribution for the $j^{th}$ time slot 710(j). As discussed above, the normalized PD distribution for a time slot may be a combination of multiple normalized PD distributions for the time slot (e.g., for the case of multiple active antennas). The processor 110 may then compare the peak value in the time-averaged normalized PD distribution 720 with one to assess RF exposure compliance. If the peak value is equal to or less than one (i.e., satisfies the condition 1), then the processor 110 may determine RF exposure compliance.

In certain aspects, the processor 110 may determine maximum allowable power levels for a future time slot to ensure time-averaged RF exposure compliance. In this regard, the time slots 715(1)-715(q-1) in FIG. 7 may correspond to previous transmissions by the wireless device 100, and the time slot 715(q) may correspond to a future transmission. In this regard, the time slot 715(q) is referred to as the future time slot below. Equation (10a) may be rewritten as follows:

$$\frac{1}{q}\left[\left(\sum_{j=1}^{j=q-1} PD_{norm\_j}\right) + PD_{norm\_q}\right] \leq 1 \quad (10b)$$

where $PD_{norm\_q}$ is the normalized PD distribution for the future time slot 715(q).

In this example, it is assumed that the transmission power levels for the normalized PD distributions 710(1)-710(q-1) are known by the processor 110 since they correspond to previous transmissions by the wireless device 100. For example, the processor 110 may record the transmission power levels and transmit scenario for each of the time slots 715(1)-715(q-1) in the memory 115, and use the recorded transmission power levels and transmit scenarios for the time slots 715(1)-715(q-1) to determine the normalized PD distributions 710(1)-710(q-1) for these time slots. For time slots 715(1)-715(q-1), the normalized PD distribution 710(j) for the $j^{th}$ time slot 715(j) may be determined determined using equation (6a) or (6b) for all transmission scenarios and power levels that were active during the $j^{th}$ time slot 715(j).

In this example, the transmission power levels for the normalized PD distribution 710(q) corresponding to the future time slot 715(q) are variables to be solved by the processor 110. To determine the maximum allowable power levels for the future time slot 715(q), the processor 110 may compute the time-averaged normalized PD distribution 720 in which the transmission power levels for the future time slot 715(q) are variables in the time-averaged normalized PD distribution 720 (i.e., the time-averaged normalized PD distribution 720 is a function of the transmission power levels for the future time slot 715(q)). The processor 110 may then determine transmission power levels for the future time slot 715(q) such that the peak value in the time-averaged normalized PD distribution is equal to or less than one (i.e., satisfies the condition 1 in equation (10b)). The determined transmission power levels that comply with RF exposure levels are used as the maximum allowable power levels for the future time slot 715(q). In this regard, the processor 110 sets the transmission power limits for the future time slot 715(q) according to the determined maximum allowable power levels. The processor 110 may determine the maximum allowable power levels for the future time slot 715(q) during time slot 715(q-1) so that the maximum allowable power levels for the future time slot 715(q) are ready at the start of the future time slot 715(q) for the processor 110 to enforce the maximum allowable power levels.

Figure 8:
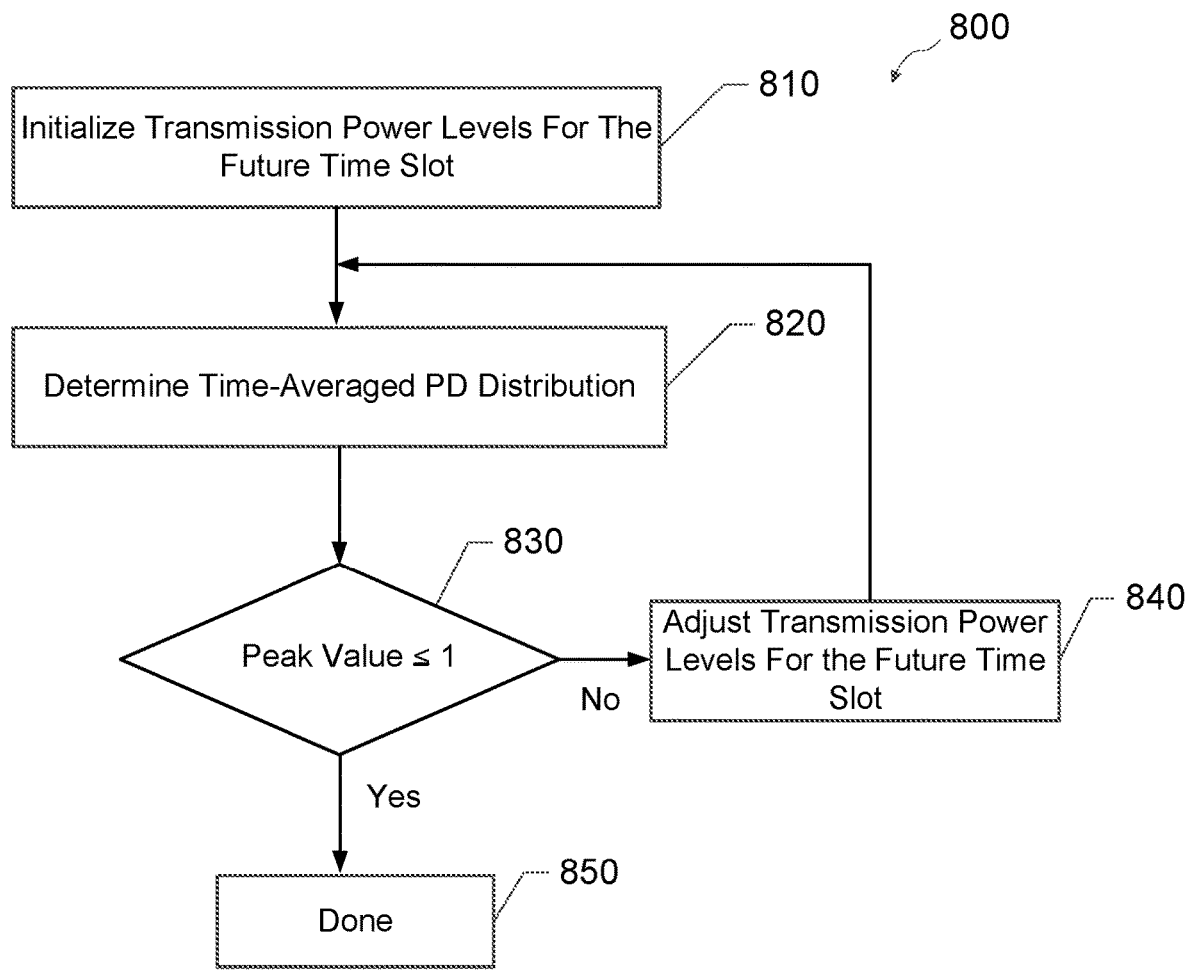
FIG. 8 is a flowchart illustrating an exemplary method for determining transmission power levels that comply with a time-average PD limit according to certain aspects of the present disclosure.

The processor 110 may determine the maximum allowable power levels for the future time slot 715(q) according to the exemplary method 800 illustrated in FIG. 8. At block 810, the processor 110 initializes the transmission power levels for the future time slot 715(q) according to the transmit scenario for the future time slot 715(q). For example, the transmission power levels may be initialized according to a power control loop, a desired data rate, a desired beam direction or sector, etc. In one example, the transmission power levels may be initialized to a set of default transmission power levels.

At block 820, the processor 110 determines the time-averaged normalized PD distribution based on the transmit scenario and transmission power levels at block 810 for the future time slot 715(q). Note that the transmission power levels for the previous time slots 715(1)-715(q-1) are known, as discussed above.

At block 830, the processor 110 compares the peak value in the time-averaged normalized PD distribution with one to assess RF exposure compliance. If the peak value is equal to or less than one, then the method 800 ends at block 850. In this case, the processor 110 uses the transmission power levels initialized at block 810 as the maximum allowable power levels for the future time slot 715(q).

If the peak value is greater than one, then the processor 110 adjusts the transmission power levels 810 for the future time slot at block 840. The processor 110 may adjust the transmission power levels for the future time slot 715(*q*) by reducing one or more of the transmission power levels for the future time slot 715(*q*). The processor 110 then repeats blocks 820 and 830 using the adjusted transmission power levels. The processor 110 may repeat blocks 840, 820 and 830 until the peak value in the time-averaged PD distribution is equal or less than one, at which point the transmission power levels comply with the PD limit and the processor 110 uses the transmission power levels as the maximum allowable power levels for the future time slot 715(*q*).

For the example in which the second transmitter 130 transmits signals using multiple active antennas (e.g., two or more of antennas 132-1 to 132-M) during the future time slot 715(*q*), the maximum allowable power levels may include a maximum allowable power level for each of the active antennas. In this example, the processor 110 limits (constrains) the transmission power level for each of the active antennas by the respective maximum allowable power level.

It is to be appreciated that the present disclosure is not limited to the exemplary method 800 illustrated in FIG. 8, and that other methods may be employed to determine transmission power levels for the future time slot 715(*q*) such that the time-averaged normalized PD distribution complies with the PD limit. For example, the processor 110 may determine maximum allowable power levels for the future time slot 715(*q*) that result in the peak value in the time-averaged normalized PD distribution being approximately equal to or less than a value that is less than one.

Figure 9:
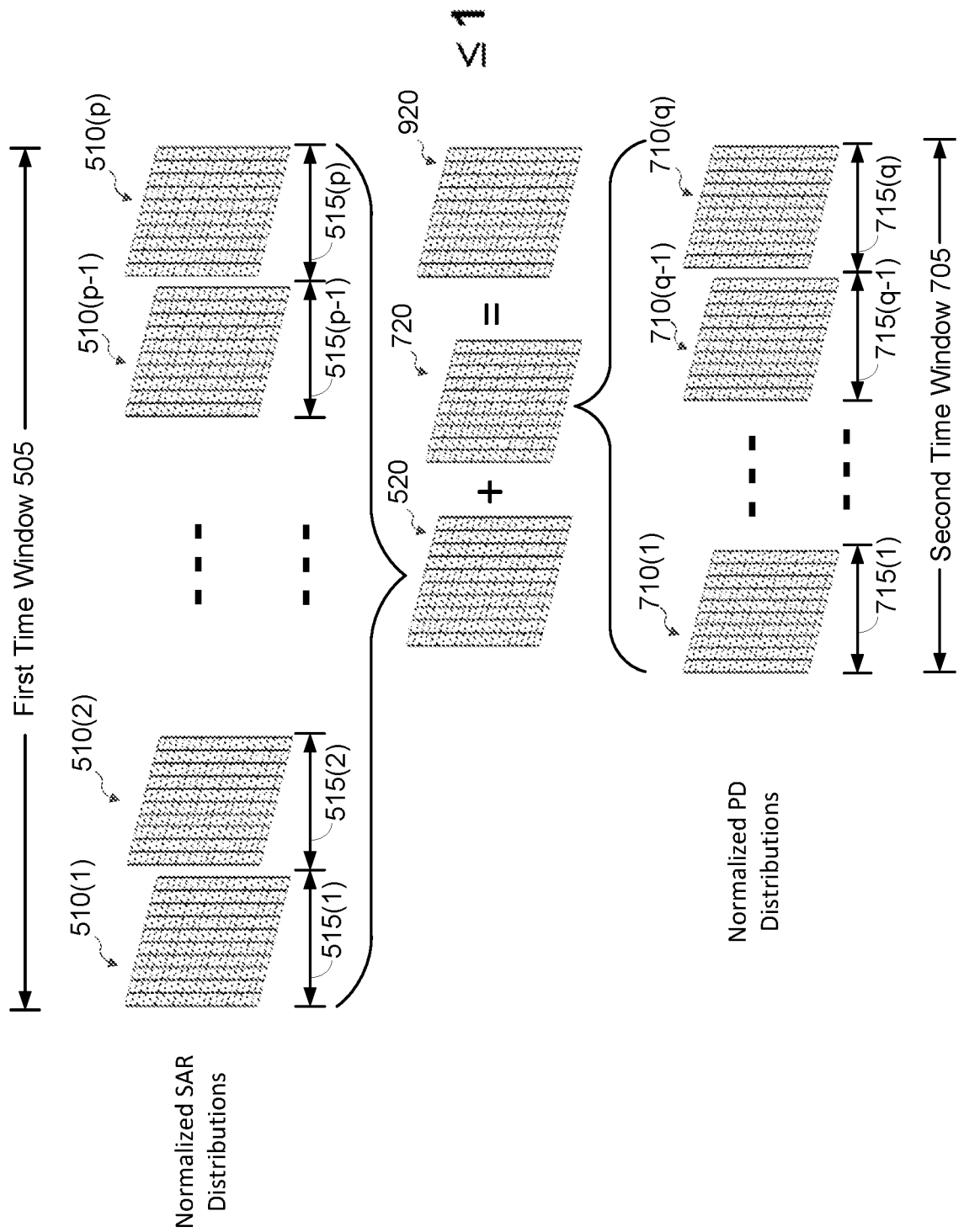
FIG. 9 shows an example of a time-averaged SAR distribution combined with a time-averaged PD distribution according to certain aspects of the present disclosure.

The processor 110 may also determine time-averaged RF exposure compliance for the case where both the first technology and the second technology are active (i.e., the wireless device simultaneously transmits signals using the first and second technologies). To do this, the processor 110 may combine the time-averaged normalized SAR distribution 520 and the time-averaged normalized PD distribution 720 to generate a combined time-averaged normalized distribution 920, as illustrated in FIG. 9. The processor 110 may then compare the peak value in the combined time-averaged normalized distribution 920 with one to assess time-averaged RF exposure compliance. If the peak value is equal to or less than one (i.e., satisfies the condition 1), then the processor 110 may determine that the wireless device 100 is compliant. The condition for compliance may be given by combining equations (9b) and (10b) as follows:

$$\frac{1}{p}\left[\left(\sum_{j=1}^{j=p-1} SAR_{norm\_j}\right) + SAR_{norm\_p}\right] + \frac{1}{q}\left[\left(\sum_{j=1}^{j=q-1} PD_{norm\_j}\right) + PD_{norm\_q}\right] \leq 1. \quad (11)$$

The first time window 505 for the time-averaged normalized SAR distribution and the second time window 705 for the time-averaged normalized PD distribution may be different in length. In this regard, FIG. 9 shows an example in which the first time window 505 is longer than the second time window 705. For example, the first time window 505 may be approximately 6 minutes in length and the second time window 705 may be approximately 2 minutes in length. The lengths of the first and second time windows may be specified by respective RF exposure regulations (e.g., established by the FCC or other regulatory body). Note that the lengths of the time windows 505 and 705 are not drawn to scale in FIG. 9.

In certain aspects, the processor 110 may determine maximum allowable power levels for the future time slots 515(*p*) and 715(*q*) of the first and second technologies to ensure time-averaged RF exposure compliance. In these aspects, the future time slots 515(*p*) and 715(*q*) may be approximately aligned in time as shown in the example in FIG. 9. To determine the maximum allowable power levels for the future time slots 515(*p*) and 715(*q*), the processor 110 may compute the combined time-averaged normalized distribution 920 in which the transmission power levels for the future time slots 515(*p*) and 715(*q*) are variables in the combined time-averaged normalized distribution 920 (i.e., the combined time-averaged normalized distribution 920 is a function of the transmission power levels for the future time slots 515(*p*) and 715(*q*)). The processor 110 may then determine the maximum allowable power levels for the future time slots 515(*p*) and 715(*q*) such that the peak value in the combined time-averaged normalized distribution 920 is equal to or less than one (i.e., satisfies the condition 1 in equation (11)). The processor 110 may then set the transmission power limits for the future time slots 515(*p*) and 715(*q*) according to the determined maximum allowable power levels.

Figure 10:
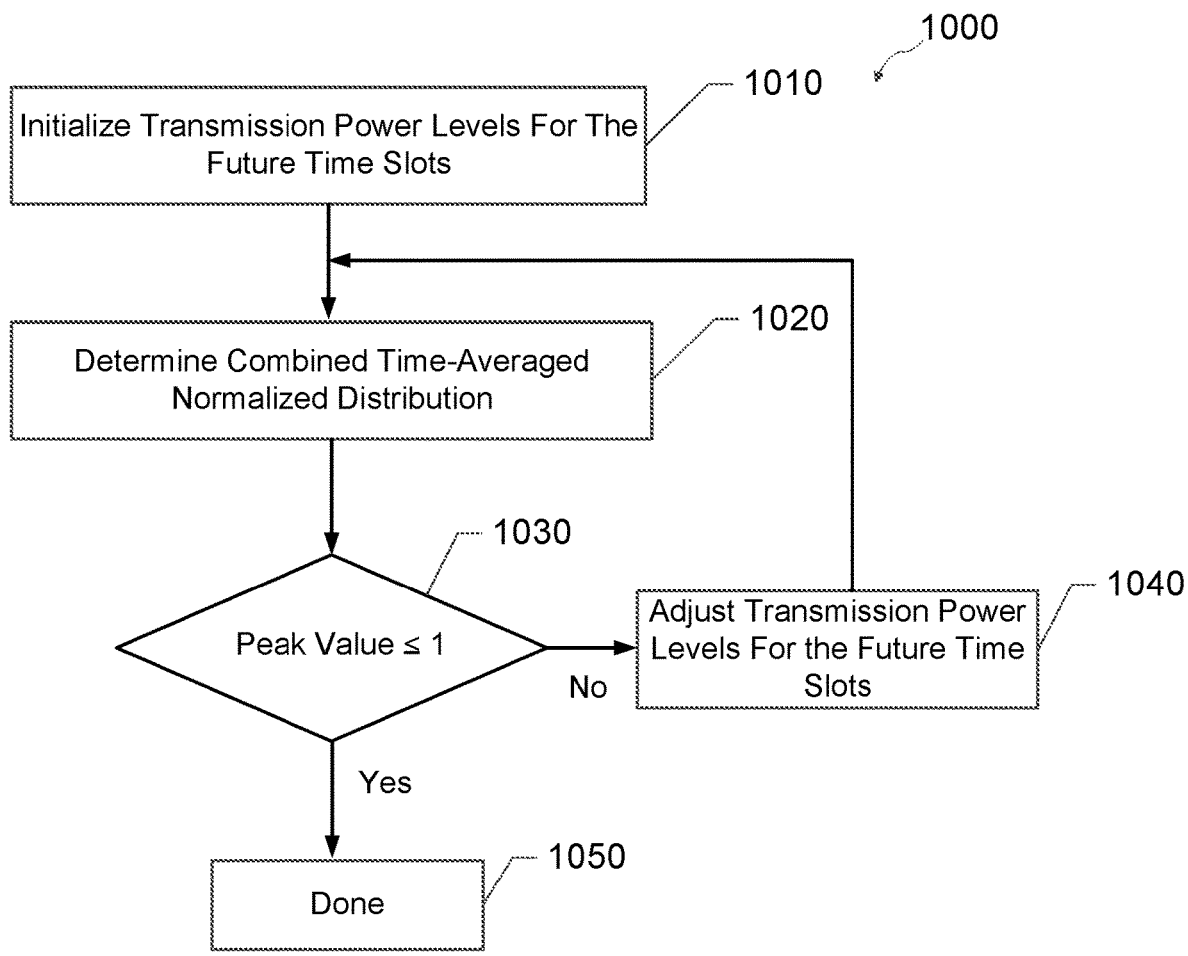
FIG. 10 is a flowchart illustrating an exemplary method for determining transmission power levels that comply with time-average RF exposure limits according to certain aspects of the present disclosure.

The processor 110 may determine the maximum allowable power levels for the future time slots 515(*p*) and 715(*q*) according to the exemplary method 1000 illustrated in FIG. 10. The maximum allowable power levels may include first maximum allowable power levels for the first technology and second maximum allowable power levels for the second technology.

At block 1010, the processor 110 initializes the transmission power levels for the future time slots 515(*p*) and 715(*q*) according to the transmit scenarios for the future time slots 515(*p*) and 715(*q*). If the transmit scenario for the future time slot 515(*p*) for the first technology uses multiple active antennas, then the transmission power levels may include a transmission power level for each of the active antennas. Similarly, if the transmit scenario for the future time slot 715(*q*) for the second technology uses multiple active antennas, then the transmission power levels may include a transmission power level for each of the active antennas.

The transmission power levels may be initialized according to one or more power control loops, one or more desired data rates, one or more desired beam directions or sectors, etc. In one example, the transmission power levels may be initialized to a set of default transmission power levels.

At block 1020, the processor 110 determines the combined time-averaged normalized distribution 920 based on the transmission power levels for the future time slots 515(*p*) and 715(*q*). Note that the transmission power levels in the previous time slots 515(1)-515(*p*-1) for the first technology and the transmission power levels in the previous time slots 715(1)-715(*q*-1) for the second technology are known, as discussed above.

At block 1030, the processor 110 compares the peak value in the combined time-averaged normalized distribution with one to assess RF exposure compliance. If the peak value is equal to or less than one, then the method 1000 ends at block 1050. In this case, the processor 110 uses the transmission power levels initialized at block 1010 as the maximum allowable power levels for the future time slots 515(*p*) and 715(*q*).

If the peak value is greater than one, then the processor 110 adjusts the transmission power levels for the future time slots at block 1040. The processor 110 may adjust the transmission power levels for the future time slots by reducing one or more of the transmission power levels for the future time slots. The processor 110 then repeats blocks 1020 and 1030 using the adjusted transmission power levels. The processor 110 may repeat blocks 1040, 1020 and 1030 until the peak value in the combined time-averaged normalized distribution is equal or less than one, at which point the transmission power levels for the future time slots are compliant and the processor 110 uses the transmission power levels as the maximum allowable power levels. The determined maximum allowable power levels include the first maximum allowable power levels for the first technology and the second maximum allowable power levels for the second technology. In this regard, the processor 110 sets the transmission power limits for the first transmitter 120 according to the first maximum allowable power levels and sets the transmission power limits for the second transmitter 130 according to the second maximum allowable power levels.

It is to be appreciated that the present disclosure is not limited to the exemplary method 1000 illustrated in FIG. 10, and that other methods may be employed to determine maximum allowable power levels for the future time slots 515(*p*) and 715(*q*) such that the combined time-averaged normalized distribution 920 complies with the RF exposure limits.

In certain aspects, the time-averaging window for PD is dependent on transmitting frequency (e.g., ~2 minutes in 28 GHz band and ~1 minute in 60 GHz). In these aspects, when the second transmitter 130 transmits signals at multiple frequency bands, the time-average PD distribution may be computed using a different time window for each frequency band. For example, if the second transmitter 130 transmits signals at a first frequency band (e.g., 28 GHz) and a second frequency band (e.g., 60 GHz), the time-average PD distribution may be given by:

$$\frac{1}{q}\sum_{j=1}^{j=q} PD_{norm\_j} + \frac{1}{r}\sum_{j=1}^{j=r} PD_{norm\_j} \qquad (12)$$

where q is the number of time slots for the first frequency band (e.g., 28 GHz band), and r is the number of time slots for the second frequency band (e.g., 60 GHz band). Since different time windows are used for the first and second frequency bands, the number of time slots for the frequency band is different from the number of time slots for the second frequency band (i.e., q and r are different).

Figure 11:
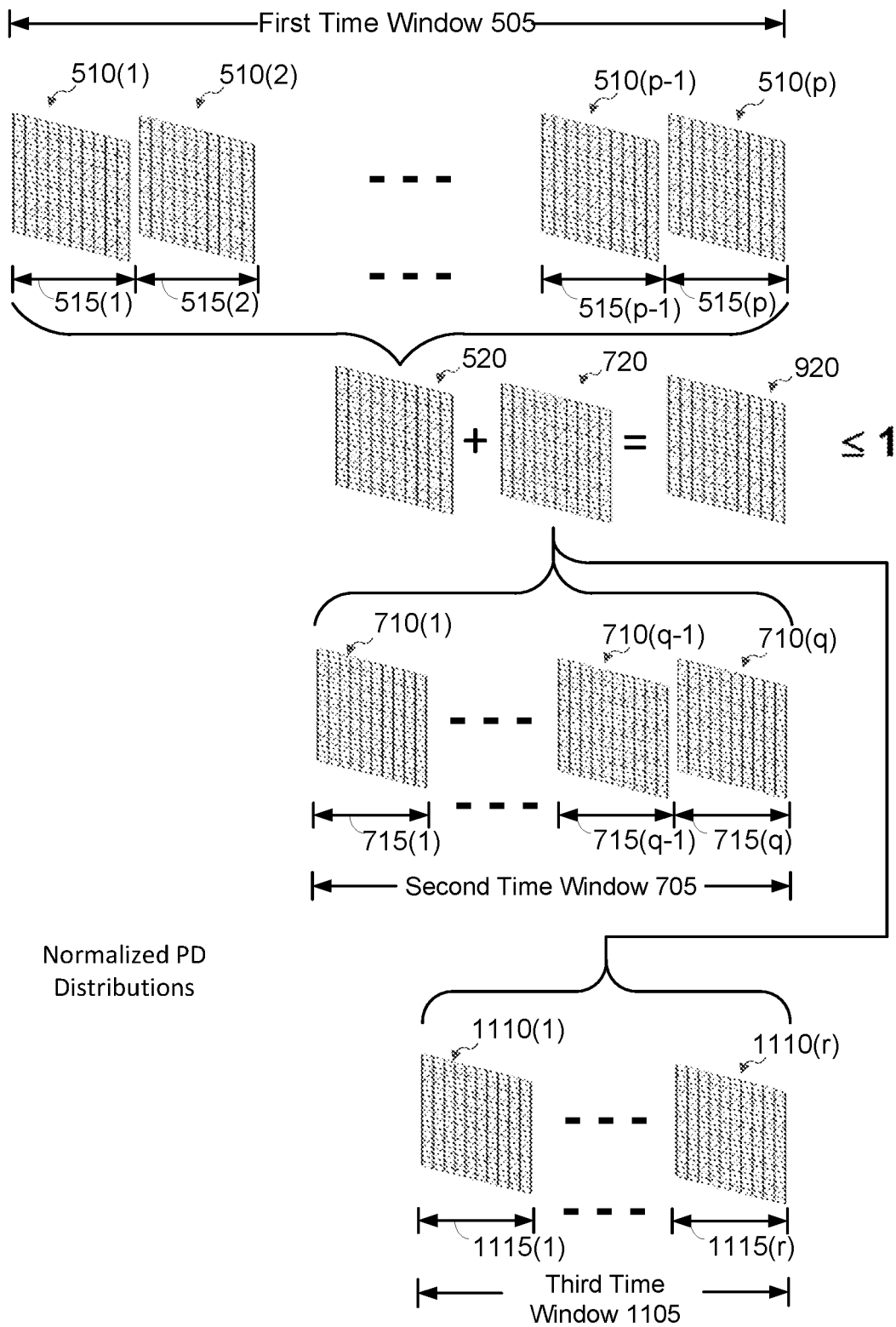
FIG. 11 shows an example in which a time-averaged PD distribution is determined using multiple time-averaging windows for different frequency bands according to certain aspects of the present disclosure.

FIG. 11 shows an example in which two time-averaging windows are used for PD. In this example, the second time window 705 discussed above is used for the first frequency band (e.g., 28 GHz band) and a third time window 1105 is used for the second frequency band (e.g., 60 GHz band), in which the third time window 1105 is shorter than the second time window 705. For example, the second time window 705 may have a length of approximately two minutes and the third time window 1105 may have a length of approximately one minute.

As shown in FIG. 11, the third time window 1105 is divided into r number of time slots 1115(1) to 1115(*r*). There are r number of normalized PD distributions 1110(1) to 1110(*r*) for the second frequency band, where each normalized PD distribution corresponds to a respective one of the time slots 1115(1) to 1115(*r*). In this example, time slots 1115(1) to 1115(*r*-1) correspond to previous time slots and time slot 1115(*r*) corresponds to a future time slot approximately aligned with future time slots 515(*p*) and 715(*q*).

In this example, the normalized PD distribution for each of the previous time slots 715(1) to 715(*q*-1) in the second time window 705 may be determined based on the transmit scenario and transmission power levels for the first frequency band during the time slot. The normalized PD distribution for the future time slot 715(*q*) is a function of transmission power levels for the first frequency band in the future time slot 715(*q*). Similarly, the normalized PD distribution for each of the previous time slots 1115(1) to 1115(*r*-1) in the third time window 1105 may be determined based on the transmit scenario and transmission power levels for the second frequency band during the time slot. The normalized PD distribution for the future time slot 1115(*r*) is a function of transmission power levels for the second frequency band in the future time slot 1115(*r*).

The time-average normalized PD distribution 720 may be computed according to equation (12) above, in which the time-average normalized PD distribution is a function of the transmission power levels for the first frequency band in the future time slot 715(*q*) and the transmission power levels for the second frequency band in the future time slot 1115(*r*).

In this example, the time-average normalized PD distribution 720 is a combination of the time-average normalized PD distribution for the first frequency band corresponding to the second time window 705 and the time-average normalized PD distribution for the second frequency band corresponding to the third time window 1105. In this regard, the time-average PD distribution 720 may be considered a combined time-averaged PD distribution.

For the example in which the wireless device 100 also transmits signals using the first technology, the time-averaged normalized PD distribution may be combined with the time-averaged normalized SAR distribution to obtain the combined time-averaged normalized distribution discussed above. In this example, the combined time-averaged normalized distribution is a function of the transmit scenario and transmission power levels for the first technology in the future time slot 515(*p*), the transmit scenario and transmission power levels for the first frequency band in the future time slot 715(*q*), and the transmit scenario and transmission power levels for the second frequency band in the future time slot 1115(*r*). The maximum allowable power levels may be determined by determining transmission power levels that result in the peak value of the combined time-averaged normalized distribution being equal to or less than one (e.g., according to the method 1000 illustrated in FIG. 10). In this example, the maximum allowable power levels include maximum allowable power levels for the first technology, maximum allowable power levels for the first frequency band, and maximum allowable power levels for the second frequency band. During the future time slots 515(*p*), 715(*q*) and 1115(*r*), the processor 110 sets the transmission power limits for the first technology according to the maximum allowable power levels for the first technology, sets the transmission power limits for the first frequency band according to the maximum allowable power levels for the first frequency band, and sets the transmission power limits for the second frequency band according to the maximum allowable power levels for the second frequency band.

Although two time-averaging widows 705 and 1105 are used for PD in the above example, it is to be appreciated that more than two time-averaging widows may be used depending on the number of different frequency bands above 10 GHz that are active. In general, the number of time-averaging windows used for PD may be equal to the number of active frequency bands above 10 GHz, where each time-averaging window corresponds to a respective one of the active frequency bands.

Figure 12:
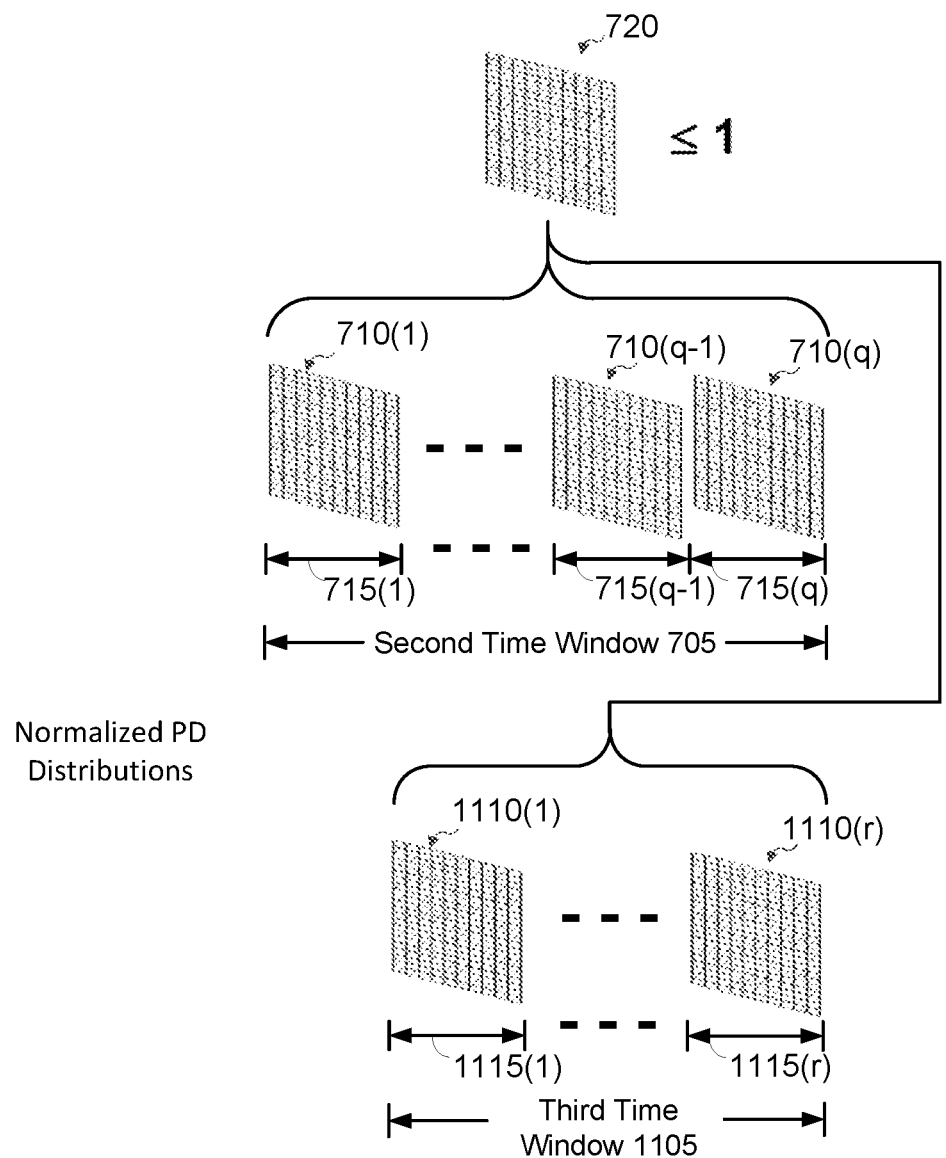
FIG. 12 shows an example in which a time-averaged PD distribution is determined for simultaneous transmissions at different frequency bands according to certain aspects of the present disclosure.

In certain aspects, the wireless device 110 may simultaneously transmit signals at the first and second frequency bands (e.g., 28 GHz and 60 GHz) while the first technology is not active. In this case, the processor 110 may determine maximum allowable power levels for the first and second frequency bands as follows. The processor may determine the time-average normalized PD distribution according to equation (12) in which the time-average normalized PD distribution is a function of the transmission power levels for the first frequency band in future time slot 715($q$) and the transmission power levels for the second frequency band in future time slot 1115($r$). An example of this is illustrated in FIG. 12, in which the condition for RF exposure compliance is that the time-averaged normalized PD distribution 720 be equal to or less than one. Note that the time-average normalized PD distribution is not combined with the time-averaged normalized SAR distribution 520 in this case since the first technology is not active in this case.

The processor 110 may then determine transmission power levels for the first frequency band and second frequency band that result in the peak value in the time-average normalized PD distribution being equal to or less than one, and use the determine transmission power levels as the maximum allowable power levels. In this example, the maximum allowable power levels include maximum allowable power levels for the first frequency band, and maximum allowable power levels for the second frequency band. During the future time slots 715($q$) and 1115($r$), the processor 110 sets the transmission power limits for the first frequency band according to the maximum allowable power levels for the first frequency band and sets the transmission power limits for the second frequency band according to the maximum allowable power levels for the second frequency band. It is to be appreciated that the above technique may be expanded to three or more frequency bands to determine maximum allowable power levels for three or more frequency bands.

Figure 13:
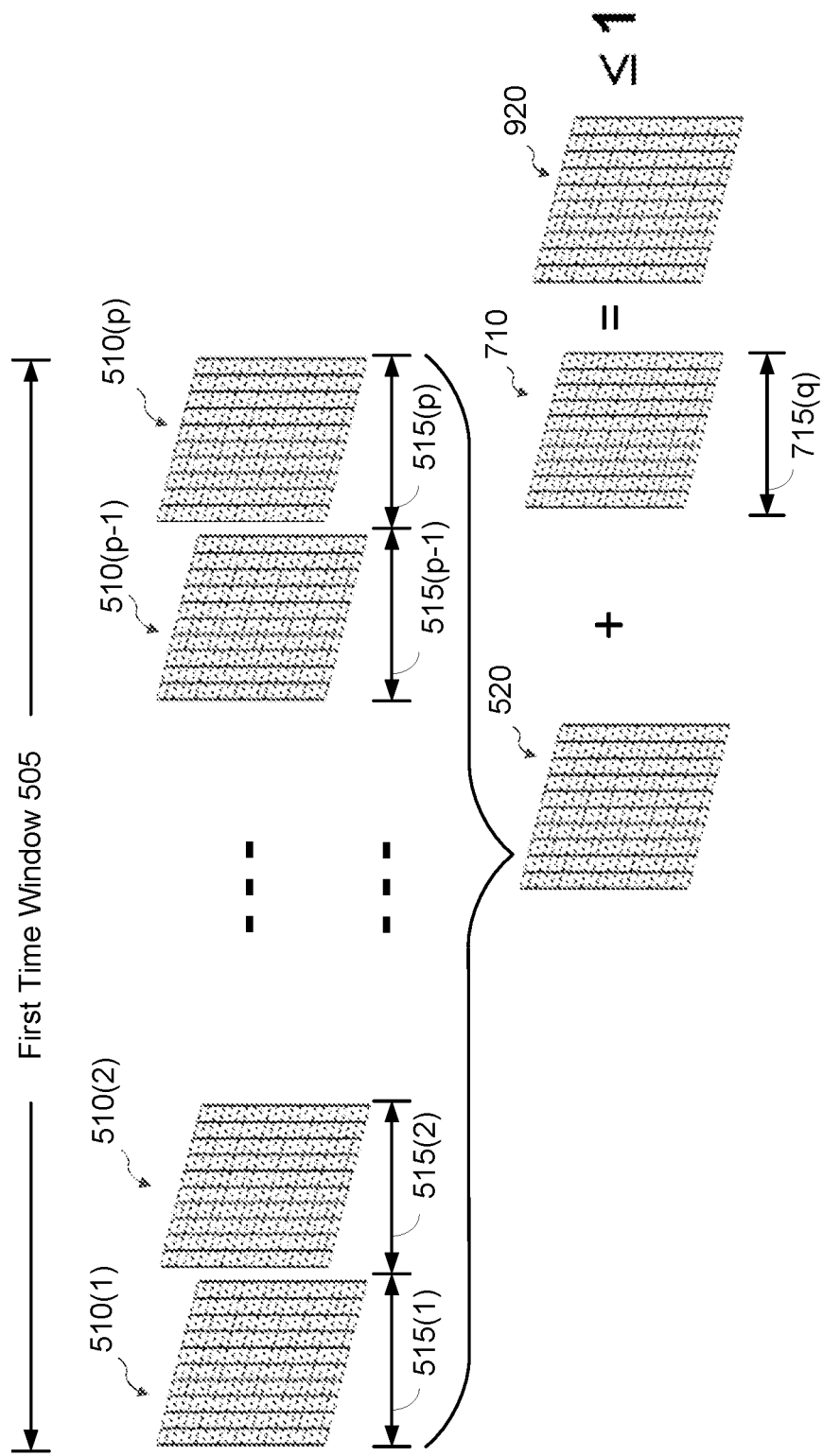
FIG. 13 shows an example of a time-averaged SAR distribution combined with a PD distribution according to certain aspects of the present disclosure.

Some RF exposure regulations may not require time averaging of PD or may not currently specify time-averaging for PD (which could change). In these cases, the time-averaged SAR distribution may be combined with a normalized PD distribution to assess RF exposure compliance. An example of this is illustrated in FIG. 13 in which the time-averaged normalized SAR distribution 520 is combined with the normalized PD distribution for the future time slot 715($q$) to obtain the combined normalized distribution 920.

In this example, the processor 110 may determine maximum allowable power levels for the first and second technologies as follows. The processor 110 combines the time-averaged normalized SAR distribution 520 with the normalized PD distribution 710 for the future time slot 715($q$) to obtain the combined normalized distribution 920 in which the combined normalized distribution 920 is a function of the transmission power levels for the first technology in future time slot 515($p$) and the transmission power levels for the second technology in future time slot 715($q$).

The processor 110 may then determine transmission power levels for the first and second technologies that result in the peak value in the normalized distribution 920 being equal to or less than one, and use the determined transmission power levels as the maximum allowable power levels.

In this example, the maximum allowable power levels include maximum allowable power levels for the first technology, and maximum allowable power levels for the second technology. During the future time slots 515($p$) and 715($a$), the processor 110 sets the transmission power limits for the first transmitter 120 according to the maximum allowable power levels for the first technology and sets the transmission power limits for the second transmitter 130 band according to the maximum allowable power levels for the second technology.

It is to be appreciated that the time slots 515(1)-515($p$) discussed above may be equal in length or that two or more of the time slots 515(1)-515($p$) may have different lengths. The future time slot 515($p$) may also be referred to as a time interval and may have a length that is equal to or less than a tenth the length of the first time window 505. In one example, the future time slot 515($p$) has a length of approximately 5 seconds and the first time window 505 has a length of approximately 6 minutes.

It is to be appreciated that the time slots 715(1)-715($q$) discussed above may be equal in length or that two or more of the time slots 715(1)-715($q$) may have different lengths. The future time slot 715($q$) may also be referred to as a time interval and may have a length that is equal to or less than a fifth the length of the second time window 705. In one example, the future time slot 715($q$) has a length of approximately 5 seconds and the second time window 705 has a length of approximately 2 minutes.

It is to be appreciated that the time slots 1115(1)-1115($r$) discussed above may be equal in length or that two or more of the time slots 1115(1)-1115($r$) may have different lengths. The future time slot 1115($r$) may also be referred to as a time interval and may have a length that is equal to or less than a fifth the length of the third time window 1105. In one example, the future time slot 1115($r$) has a length of approximately 5 seconds and the third time window 1105 has a length of approximately one minute.

The first time window 505 may have a length that is at least 50 percent longer than the length of the second time window 705. In one example, the first time window 505 has a length of approximately 6 minutes, and the second time window 705 has a length of approximately 2 minutes, in which the lengths of the first and second time windows may be set by regulatory bodies. It is to be appreciated that the lengths of the first and second time windows 505 and 705 set by the regulator bodies may change with time, and may vary between different regulatory bodies. As discussed above, regulatory bodies may define time windows that are dependent on transmitting frequency, for example, time-window length of 2 minutes for 28 GHz band and time-window length of one minute for 60 GHz bands. In that case, it is to be also appreciated that there could be one time window for SAR and two or more time windows for PD with each time window for PD corresponding to a given transmission frequency band.

As used herein, the term "previous time slots" refers to time slots prior to the respective future time slot. For example, time slots 515(1)-515($p$−1) in FIG. 5 are previous time slots, which are prior to future time slot 515($p$).

As used herein, the term "future time slot" refers to a time slot (i.e., time interval or time duration) in the future with respect to the time that the respective maximum allowable power levels are determined. Determining the maximum allowable power levels for the future time slot before the future time slot helps ensure RF exposure compliance during the future time slot. Since the future time slots 515($p$), 715(*q*) and 1115(*r*) discussed above are approximately aligned in time, they may collectively be considered one future time slot.

It is to be appreciated that the time windows discussed above (e.g., time windows 505, 705 and 1105) may be moving time-averaging windows. In this case, each time window is shifted by one time slot each time the maximum allowable power levels for a new future time slot are determined. For example, in the above discussion of time window 505, time slot 515(*p*) is given as the future time slot. To determine the maximum allowable power levels for the next future time slot 515(*p*+1), the processor 110 shifts the time window 505 by one time slot to cover time slots 515(2) to 515(*p*+1). Note that the first time slot 515(1) in the previous determination of the maximum allowable power levels is dropped from the time window 505, and the future time slot 515(*p*) in the previous determination of the maximum allowable power levels becomes the last one of the previous time slots in the time window 505.

It is to be appreciated that the first communication technology discussed above may include multiple communication technologies in which SAR is used to assess RF exposure compliance. For example, the first technology may include WWAN, WLAN, Bluetooth, etc. In this regard, it is to be appreciated that the first transmitter 120 may include multiple transmitters. Also, it is to be appreciated that SAR may have contributions from multiple sub-6 GHz communication technologies (e.g., simultaneous transmissions of WWAN, WLAN and Bluetooth).

It is to be appreciated that the second communication technology discussed above may include multiple communication technologies in which PD is used to assess RF exposure compliance. For example, the second technology may include mmWave/5G and mmWave/802.11ad. In this regard, it is to be appreciated that the second transmitter 130 may include multiple transmitters. Also, it is to be appreciated that PD may have contributions from multiple communication technologies (e.g., simultaneous transmissions of mmWave/5G and mmWave/802.11ad).

In some of the examples given above, a normalized distribution is compared with one to assess RF exposure compliance. However, it is to be appreciated that the present disclosure is not limited to these examples. For example, a distribution (e.g., SAR distribution, PD distribution, combined RF exposure distribution, etc.) may be normalized relative to any value such that a limit value other than one may be used to define the condition for RF exposure compliance. In this example, the condition for RF compliance is that the normalized distribution be equal to or less than the limit value. Also, as discussed above, the limit value may be set to a value less than one.

As discussed above, the processor 110 may determine a maximum allowable power level for a transmitter (e.g., the first transmitter 120 or the second transmitter 130) for a future time slot (e.g., according to any of the methods described herein) and set a transmission power limit for the transmitter based on the determined maximum allowable power level. In certain aspects, setting the transmission power limit based on the determined maximum allowable power level prevents a power level of the transmitter from exceeding the maximum allowable power level at any time during the future time slot. In certain aspects, setting the transmission power limit based on the determined maximum allowable power level prevents a time-average of a power level of the transmitter over the future time slot from exceeding the maximum allowable power level. This allows the power level to temporarily exceed the maximum allowable power level within the future time slot as long as the time-average of the power level over the future time slot does not exceed the maximum allowable power level. In these aspects, the power level may exceed the maximum allowable power level for a time interval shorter than the future time slot. In these aspects, the maximum allowable power level is a maximum allowable time-average power level over the future time slot.

Figure 14:
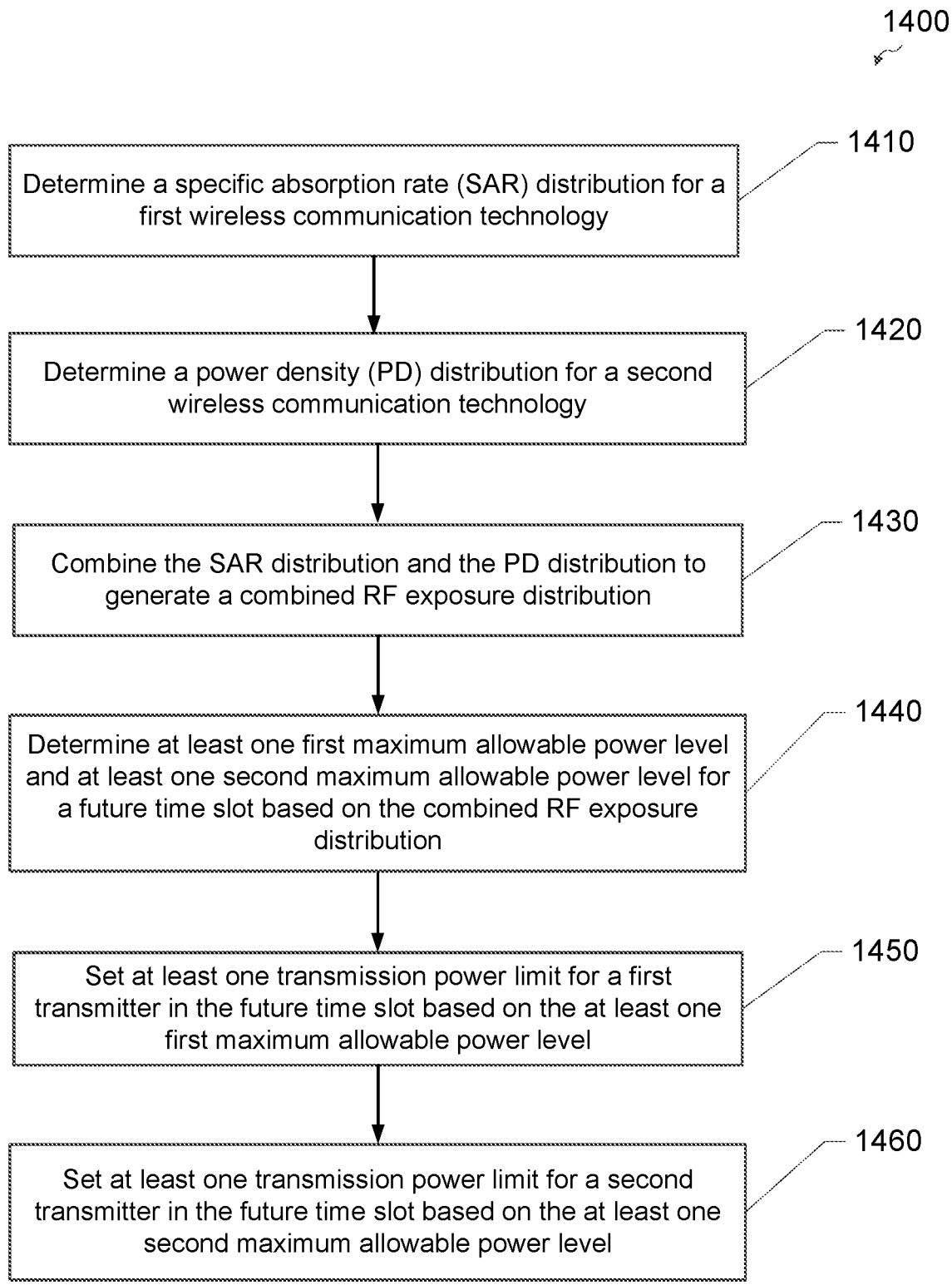
FIG. 14 is a flowchart showing an example of a method implemented in a wireless device according to certain aspects of the present disclosure.

FIG. 14 illustrates an exemplary method 1400 implemented in a wireless device (e.g., wireless device 100) according to certain aspects of the present disclosure.

At block 1410, a specific absorption rate (SAR) distribution for a first wireless communication technology is determined. For example, the SAR distribution may comprise a time-averaged SAR distribution corresponding to a time-averaging window (e.g., time window 505). The first wireless communication technology may include one or more of the following: WWAN, WLAN, 3G, 4G, Bluetooth, etc.

At block 1420, a power density (PD) distribution for a second wireless communication technology is determined. For example, the PD distribution may comprise a time-averaged PD distribution corresponding to one or more time-averaging windows (e.g., time windows 705 and/or 1105). The second wireless communication technology may include one or more of the following: 5G, IEEE 802.11ad, etc.

At block 1430, the SAR distribution and the PD distribution are combined to generate a combined RF exposure distribution.

At block 1440, at least one first maximum allowable power level and at least one second maximum allowable power level are determined for a future time slot based on the combined RF exposure distribution. For example, the combined RF exposure distribution may be a function of transmission power levels in the future time slot. In this example, the at least one first maximum allowable power level and the at least one second maximum allowable power levels may be determined by determining power levels for the transmission power levels that result in a peak value of the combined RF exposure distribution being equal to or less than a limit value (e.g., limit value of one) that ensures RF exposure compliance.

At block 1450, at least one transmission power limit for a first transmitter in the future time slot is set based on the at least one first maximum allowable power level. Setting the at least transmission power limit for the first transmitter (e.g., first transmitter 120) based on the at least one first maximum allowable power level may limit transmission power levels of the first transmitter in the future time slot to the at least one first maximum allowable power level or limit a time-averaged transmission power level of the first transmitter over the future time slot to the at least one first maximum allowable power level.

At block 1460, at least one transmission power limit for a second transmitter in the future time slot is set based on the at least one second maximum allowable power level. Setting the at least transmission power limit for the second transmitter (e.g., second transmitter 130) based on the at least one second maximum allowable power level may limit transmission power levels of the second transmitter in the future time slot to the at least one second maximum allowable power level or limit a time-averaged transmission power level of the second transmitter over the future time slot to the at least one second maximum allowable power level.

It is to be appreciated that the method 1400 is not limited to the exemplary order shown in FIG. 14. For example, block 1420 may be performed before block 1410 or both blocks 1410 and 1420 may be performed contemporaneously. Also, block 1460 may be performed before block 1450 or both blocks 1450 and 1460 may be performed contemporaneously.

In the exemplary time-averaging approach discussed above with reference to FIG. 9, the processor 110 determines a time-averaged SAR distribution 505 for the first technology over a first time window 505 and determines a time-averaged PD distribution 705 for the second technology over a second time window 705, in which the first time window 505 and the second time window 705 have different time durations (i.e., different lengths). The processor 110 then combines the time-averaged SAR distribution 505 and the time-averaged PD distribution 705 to obtain a combined time-averaged distribution 920, and determines a maximum allowable power level for the first technology and a maximum allowable power level for the second technology for a future time slot based on the combined time-averaged distribution 920. The processor 110 may make this determination every $\Delta t$ seconds, where $\Delta t$ seconds (e.g., 5 seconds) is the time duration of one time slot. In this case, the processor 110 updates the maximum allowable power level for the first technology and the maximum allowable power level for the second technology every $\Delta t$ seconds (e.g., 5 seconds), and the first time window 505 and the second time window 705 are moving time-averaging windows, as discussed above. In the example shown in FIG. 9, the same time-slot duration (e.g., 5 seconds) is used for the first technology and the second technology.

The maximum peak-to-average ratio (PAR) for each technology in a future time slot may be given by:

$$PAR_{max} = 10 * \log 10(\text{time window}/\Delta t) \quad (13)$$

where $PAR_{max}$ is the maximum allowable PAR, time_window is the time duration of the respective time-averaging window (e.g., the first time window 505 for the first technology and the second time window 705 for the second technology), and $\Delta t$ is the time duration of the future time slot. Here, the average transmit power level for each technology in the future time slot is given by the respective maximum allowable power level determined for the future time slot.

For example, if the first time window 505 for the first technology is 100 seconds and $\Delta t$ is 5 seconds, then the maximum allowable PAR for the first technology equals 20 dB. If the second time window 705 for the second technology is 30 seconds and $\Delta t$ is 5 seconds, then the maximum allowable PAR for the second technology equals 7.8 dB. A problem with this is that a high PAR may be required for the second technology (e.g., mmWave communication). For example, for mmWave communication, the average transmit power may be approximately 8 dBm and a transmit power of over 23 dBm may be required to maintain a radio link at a cell edge, which translates into a PAR of over 15 dB.

The maximum PAR for a technology (e.g., the second technology) may be increased by decreasing $\Delta t$ (i.e., time duration of one time slot). Decreasing $\Delta t$ causes the processor 110 to update the maximum allowable power level for the first technology and the maximum allowable power level for the second technology more frequently, which consumes more computational resources for both technologies. However, decreasing $\Delta t$ in order to meet a PAR requirement for one technology (e.g., the second technology) may not be needed for another technology (e.g., the first technology) that already meets its PAR requirement. In this case, decreasing $\Delta t$ (i.e., time duration of one time slot) results in an unnecessary increase in computational resources for the other technology (e.g., first technology).

To address this, aspects of the present disclosure allow the maximum allowable power levels for different technologies to be updated at different rates while still meeting total RF exposure compliance, as discussed further below.

Figure 15:
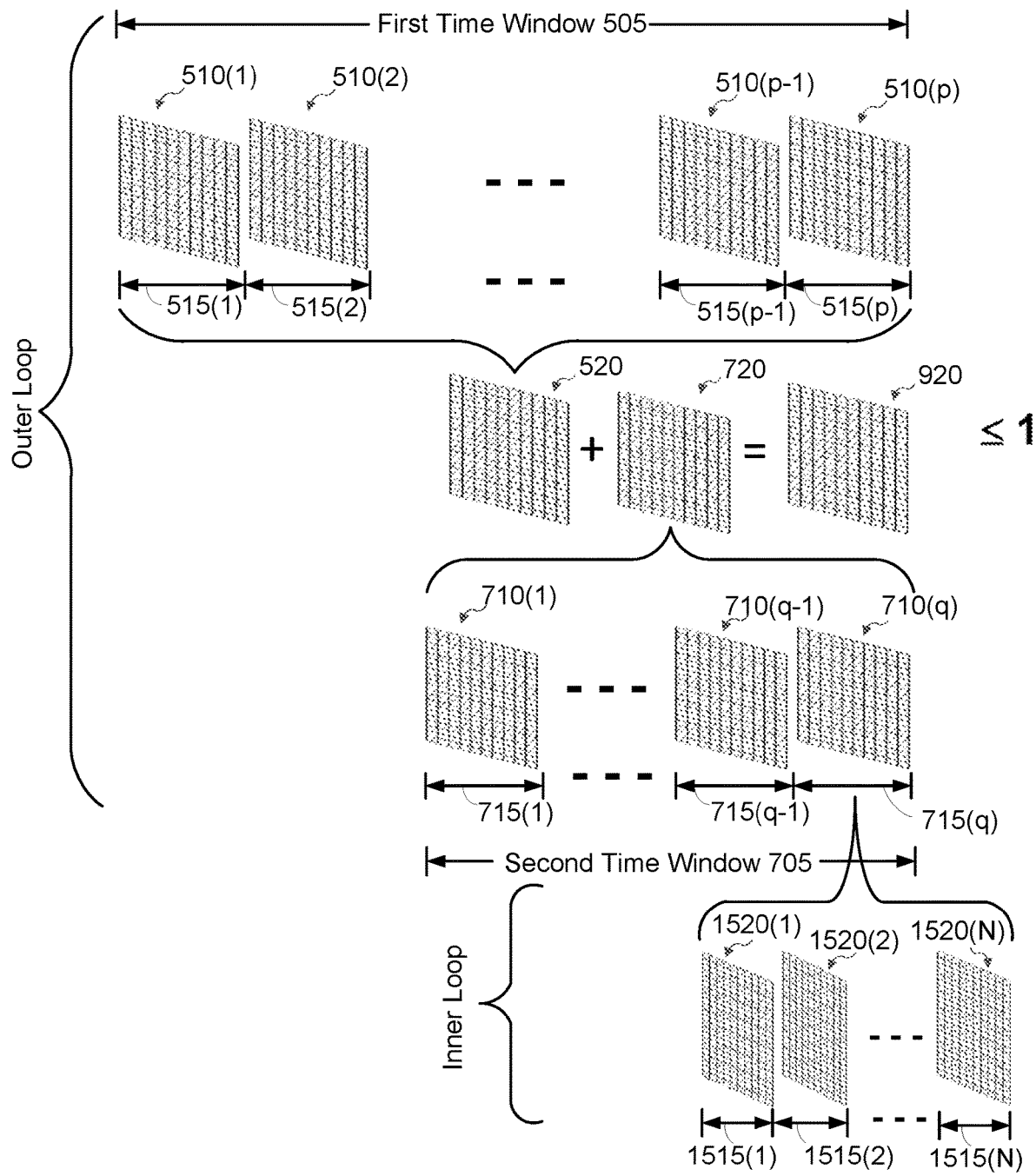
FIG. 15 shows an example in which maximum allowable power levels are determined at different rates for different technologies according to certain aspects of the present disclosure.

In certain aspects, the maximum allowable power level for the second technology is updated in smaller time intervals than the first technology in order to increase the maximum allowable PAR for the second technology without requiring an increase in the computational load for the first technology. In these aspects, the future time slot 715($q$) for the second technology is further divided (partitioned) into smaller time slots 1515(1) to 1515(N), as shown in FIG. 15. The processor 110 may determine a normalized PD distribution 1520(1) to 1520(N) for each of the smaller time slots 1515(1) to 1515(N), as discussed further below. In the description below, the smaller time slots 1515(1) to 1515(N) are referred to as sub-time slots for ease of discussion.

In these aspects, the processor 110 determines the maximum allowable power level for the future time slot 715($q$) in an outer loop. In the outer loop, the processor 110 determines the maximum allowable power level for the future time slot 715($q$) based on the combined time-averaged RF exposure distribution 920 as discussed above to ensure total RF exposure compliance. The processor 110 updates the maximum allowable power level for the future time slot 715($q$) every $\Delta t$ seconds (i.e., duration of one time slot), as discussed above. For example, if the duration of one time slot is 5 seconds, then the processor 110 determines the maximum allowable power level for the future time slot 715($q$) every 5 seconds. Note that the same time slot duration is used for the first technology and the second technology in the outer loop to meet total RF exposure compliance. The operations of the outer loop are discussed in greater detail above according to certain aspects with reference to FIG. 9.

In an inner loop, the processor 110 determines maximum allowable power levels for the sub-time slots 1515(1) to 1515(N) one at a time at a rate of approximately one per $\Delta t$/N seconds, where N is the number of sub-time slots in the future time slot 715($q$) and $\Delta t$ is the time duration of the future time slot 715($q$). For example, if N equals 50 and $\Delta t$ equals 5 seconds, then the processor 110 determines a maximum allowable power level for one of the sub-time slots 1515(1) to 1515(N) approximately every 100 milliseconds. Thus, the inner loop increases the update rate by a factor of N. The higher update rate increases the PAR for the second technology (e.g., mmWave communication), as discussed above.

For the inner loop, the processor 110 may use the normalized PD distribution computed for the future time slot 715($q$) in the outer loop as a normalized PD limit for the inner loop. For example, in equation (11) discussed above, the normalized PD distribution for the future time slot 715($q$) is given by $PD_{norm\_q}$, which may be scaled by the maximum allowable power level determined for the future time slot 715($q$).

In the inner loop, the processor 110 may determine a maximum allowable power level for the $n^{th}$ sub-time slot based on the following:

$$\frac{1}{N}\left[\left(\sum_{i=1}^{i=n-1} PD_{norm\_i}\right) + PD_{norm\_n}\right] \leq PD_{norm\_lim} \quad (14)$$

where N is the total number of sub-time slots 1515(1) to 1515(N), i is an index for the sub-time slots, $PD_{norm\_i}$ is the normalized PD distribution for the $i^{th}$ sub-time slot, $PD_{norm\_n}$ is the normalized PD distribution for the $n^{th}$ sub-time slot, and $PD_{nom\_lim}$ is the PD limit for the inner loop. The PD limit for the inner loop may be given by the normalized PD distribution computed for the future time slot 715(q) in the outer loop, as discussed above.

In equation (14), sub-time slots 1515(1) to 1515(1−n) are past sub-time slots relative to sub-time slot 1515(n) (i.e., prior in time to sub-time slot 1515(n)) and therefore correspond to previous transmissions by the second transmitter 130. Sub-time slot 1515(n) may be considered a future sub-time slot relative to sub-time slots 1515(1) to 1515(1−n). Since sub-time slots 1515(1) to 1515(n−1) correspond to previous transmissions, the processor 110 can determine the normalized PD distributions for sub-time slots 1515(1) to 1515(n−1) in equation (14) based on the previous transmission power levels for sub-time slots 1515(1) to 1515(n−1). For example, the processor 110 may record the transmission power levels for sub-time slots 1515(1) to 1515(n−1) and use the recorded transmission power levels to determine the normalized PD distributions for sub-time slots 1515(1) to 1515(n−1).

The processor 110 may then determine a transmission power level for sub-time slot 1515(n) such that the expression on the left side of equation (14) is equal to or less than $PD_{norm\_lim}$ (i.e., satisfies the condition $\leq PD_{norm\_lim}$). For example, the processor 110 may determine the condition is met if the peak value in the expression on the left side is equal to or less than the peak value in $PD_{norm\_lim}$. The processor 110 may use then use the determined transmission power level for sub-time slot 1515(n) as a maximum allowable power level for sub-time slot 1515(n). In this regard, the processor 110 may set a transmission power limit for the second transmitter 130 based on the maximum allowable power level for sub-time slot 1515(n) so that the transmission power level of the second transmitter 130 during sub-time slot 1515(n) is constrained by the maximum allowable power level for sub-time slot 1515(n).

The processor 110 may determine the maximum allowable power level for sub-time slot 1515(n) before the start of sub-time slot 1515(n) so that the maximum allowable power level is ready in time to enforce the maximum allowable power level for sub-time slot 1515(n) (e.g., by setting the transmission power limit of the second transmitter 130 based on the maximum allowable power level). Thus, at the time the processor 110 determines the maximum allowable power level for sub-time slot 1515(n), sub-time slot 1515(n) may be considered a future sub-time slot.

The processor 110 may determine the maximum allowable power level for each sub-time slot 1515(1) to 1515(N) based on equation (14), in which n is 1 for the first sub-time slot 1515(1) and n is N for the last sub-time slot 1515(N). In equation (14), the expression on the left side is an accumulative average given by the combination of the normalized PD distributions for sub-time slots 1515(1) to 1515(n) divided by N. For the example where the time duration of the future time slot 715(q) in the outer loop is 5 seconds and the time duration of one sub-time slot is 100 milliseconds, N equals 50. Note that the accumulative average accumulates more sub-time slots as n increases from 1 for the first sub-time slot to N for the last sub-time slot (i.e., as the processor 110 progresses through the sub-time slots 1515(1) to 1515(N)).

Thus, the processor 110 may perform the above operations in the inner loop to update the maximum allowable power level for the second technology at a higher rate than the outer loop (i.e., update the maximum allowable power level for the second technology every Δt/N seconds). The processor 110 can accomplish this without having to increase the update rate for the first technology, and thus without having to increase the computational load for the first technology. For example, if the time duration of one time slot in the outer loop is 5 seconds and the time duration of one sub-time slot in the inner loop is 100 milliseconds, then the maximum allowable power level for the first technology is updated every 5 seconds, and the maximum allowable power level for the second technology is updated every 100 milliseconds. Thus, the processor 110 is able to update maximum allowable power levels for the first technology and the second technology at different rates (i.e., different time intervals between updates).

Additional examples for determining maximum allowable power levels for the sub-time slots 1515(1) to 1515(N) in the inner loop will now be discussed according to certain aspects of the present disclosure.

Figure 16:
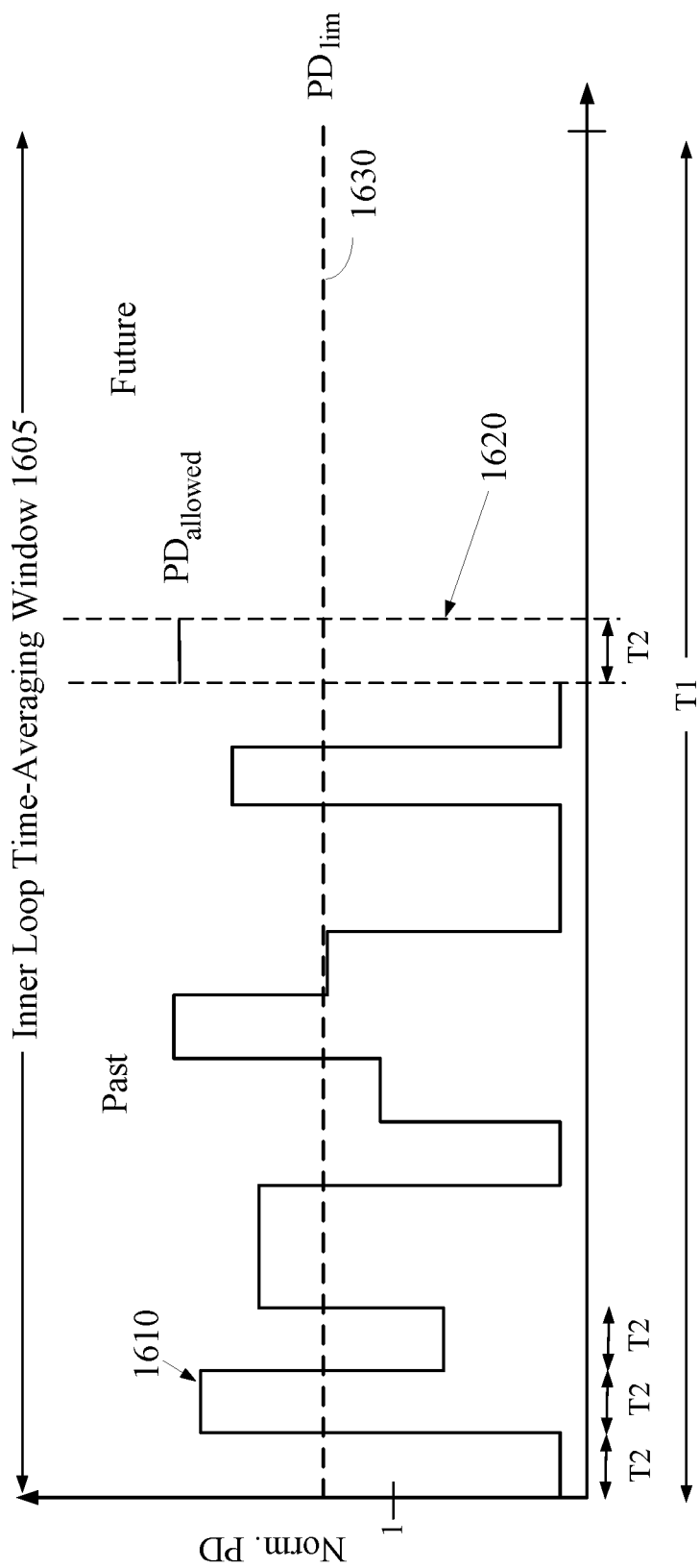
FIG. 16 shows an example of PD over time for an inner loop according to certain aspects of the present disclosure.

FIG. 16 illustrates a time-averaging window 1605 for the inner loop corresponding to the future time slot 715(q) in the outer loop. The duration of the time-averaging window 1605 is equal to the duration of one time slot in the outer loop (labeled "T1"). The time-averaging window 1605 may be temporally aligned with the future time slot 715(q) in the outer loop. In one example, the duration T1 of one time slot in the outer loop is equal to 0.5 seconds (i.e., T1=0.5 sec). The time-averaging window 1605 includes N sub-time slots, where the duration of each sub-time slot is equal to T1/N (labeled "T2"). In one example, N equals 50 and T1 equals 0.5 seconds. In this example, the duration of one sub-time slot in the inner loop is equal to 10 ms (i.e., T2=10 ms).

In the example in FIG. 16, the inner loop receives a PD limit (labeled "$PD_{lim}$") from the outer loop for the time-averaging window 1605. The PD limit may correspond to the peak PD value in the normalized PD distribution $PD_{norm\_lim}$ determined for the future time slot 715(q) discussed above. In the example in FIG. 16, the PD limit is greater than one. This is possible because the outer loop determines RF exposure compliance over a time-averaging window 705 that includes multiple time slots 715(1)-715(q). This allows the PD limit to exceed one as long as the average RF exposure over the time-averaging window 705 in the outer loop meets RF exposure compliance. In general, the PD limit from the outer loop may be greater than or less than one.

FIG. 16 shows a point in time in which the maximum allowable power level is being determined for sub-time slot 1620 within the time-averaging window 1605. FIG. 16 shows the PDs (e.g., peak PD values) for the sub-time slots within the time averaging window 1605 preceding sub-time slot 1620 (referred to as past sub-time slots below). The past sub-time slots correspond to past transmissions with respect to the point in time shown in FIG. 16. The PDs for sub-time slots succeeding sub-time slot 1620 within the time-averaging window 1605 are not shown in FIG. 16 since these sub-time slots correspond to future transmissions with respect to the point in time shown in FIG. 16.

In this example, the PD limit is met when the PD averaged over the time-averaging window 1605 is equal to or below the PD limit. Graphically, this condition is met when the area under the PD curve 1610 across the entire the time-averaging window 1605 is equal to or less than the area under the PD limit line 1630 across the entire time-averaging window 1605.

In certain aspects, the processor 110 may determine the maximum allowable power level for the ith sub-time slot within the time-averaging window 1605 based on the following:

$$PD_{allowed,i} = N \cdot PD_{lim} - (N-i) \cdot PD_R \Sigma_{k=1}^{k=i-1} PD_k \quad (15)$$

where $PD_{allowed,i}$ is an allowed PD (e.g., allowed peak PD value) for the ith sub-time slot within the time-averaging window 1605, the expression $N \cdot PD_{lim}$ is the PD allocation for the time-averaging window 1605, PDR is a reserved PD, and the summation term sums the PDs of the past sub-time slots within the time-averaging window 1605. Equation (15) can be rewritten into the following equivalent equation:

$$PD_{allowed,i} = PD_{lim} + (N-i)(PD_{lim} - PD_R) + \Sigma_{k=1}^{k=i-1}(PD_{lim} - PD_k) \quad (16).$$

In equation (15), the summation of the PDs of the past sub-time slots represents the portion of the PD allocation for the time-averaging window 1605 that has already been used up. The past sub-time slots include the first sub-time slot to the ith-1 sub-time slot in the time-averaging window 1605. The portion of the PD allocation that has already been used up is subtracted from the PD allocation for the time-averaging window 1605 since the portion of the PD allocation that has already been used up is not available for the ith sub-time slot.

The term $(N-i) \cdot PD_R$ represents the portion of the PD allocation for the time-averaging window 1605 that is reserved for future sub-time slots (i.e., sub-time slots within the time-averaging window 1605 after the ith sub-time slot). The reserved $PD_R$ is multiplied by (N-i), which is the number of future sub-time slots after the ith sub-time slot. The portion of the PD allocation reserved for future sub-time slots is subtracted from the PD allocation for the time-averaging window 1605 since the portion of the PD allocation reserved for future sub-time slots is not available for the ith sub-time slot. In certain aspects, the reserved PDR is given by:

$$PD_R = PD_{lim} \cdot PD\_reserve\_ratio \quad (17)$$

where PD_reserve_ratio is a reserve ratio. Thus, the portion of the PD allocation that is reserved for future sub-time slots may be set by setting the reserve ratio. Examples of factors for setting the reserve ratio are discussed further below according to certain aspects.

Figure 17:
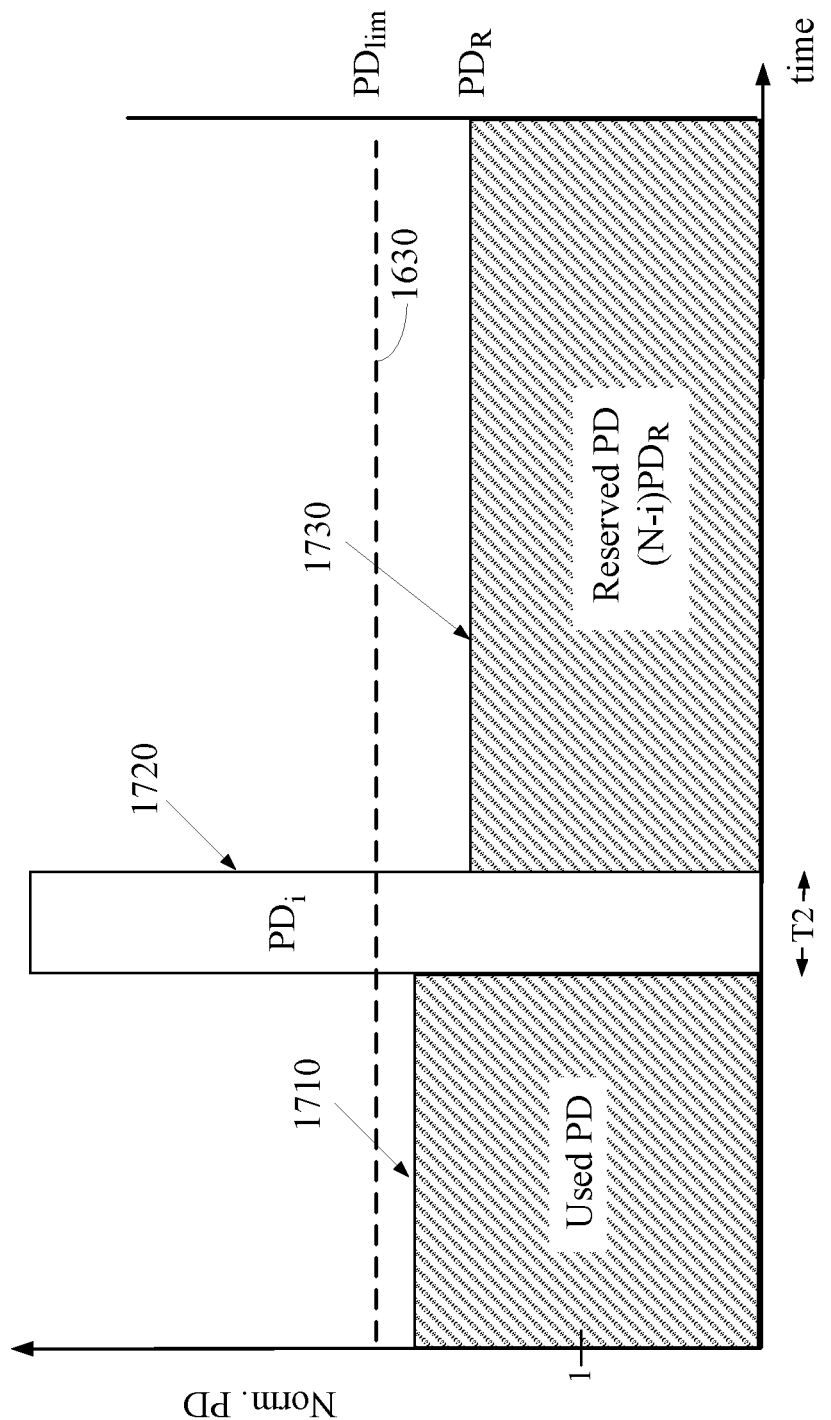
FIG. 17 shows an example of a used portion of a PD allocation, and a portion of the PD allocation reserved for future transmissions according to certain aspects of the present disclosure.

Thus, when determining the allowed PD for the ith sub-time slot, the processor 110 takes into account the portion of the PD allocation for the time-averaging window 1605 that has already been used up by past sub-time slots. The processor 110 also reserves a portion of the remaining PD allocation for future sub-time slots. FIG. 17 shows a graphical representation of the portion of the PD allocation that has already been used up by past sub-time slots 1710, the allowed PD for the ith sub-time slot 1720, and the portion of the remaining PD allocation reserved for future sub-time slots 1730. In FIG. 17, the PD allocation for the time-averaging window 1605 is represented by the area under the PD limit line 1630.

As discussed above, the processor 110 may set the portion of the PD allocation that is reserved for future sub-time slots by setting the reserve ratio. In one example, the processor 110 may set the reserve ratio based on channel conditions between the wireless device 100 (e.g., mobile wireless device) and another wireless device (e.g., base station) receiving transmissions from the wireless device 100. For example, if channel conditions are good (e.g., low interference and/or short range between the wireless devices), then the processor 110 may set the reserve ratio higher to more evenly spread out transmission power across the time-averaging window 1605. In this case, spreading out the transmission power may result in higher throughput. Setting the reserve ratio higher more evenly spreads out the transmission power by reserving a larger portion of the PD allocation for future sub-time slots.

If channel conditions are bad (e.g., high interference and/or long range between the wireless devices), then the processor 110 may set the reserve ratio lower. Setting the reserve ratio lower reduces the portion of the PD allocation reserved for future sub-time slots. This relaxes the constraint on the transmission power for a current sub-time slot imposed by the portion of the PD allocation reserved for future sub-time slots, allowing the transmitter 130 to transmit at a higher power for the current sub-time slot. In this case, transmitting at higher power (e.g., in a short burst) may be necessary to ensure that data transmitted from the wireless device 100 is successfully received by the other wireless device.

In another example, the processor 110 may set the reserve ratio based on data traffic patterns. For example, if the wireless device 100 is scheduled to transmit data toward the end of the time-averaging window 1605, then the processor 110 may set the reserve ratio higher to reserve a sufficient amount of the PD allocation for the scheduled data transmission. This may help prevent the transmitter 130 from using up all or most of the PD allocation before the scheduled data transmission, and not leaving enough of the PD allocation for the scheduled data transmission. In another example, if the wireless device 100 is scheduled to transmit data for a short duration toward the beginning of the time-averaging window 1605 with no other scheduled data transmission for the rest of the time-averaging window 1605, then the processor 110 may set the reserve ratio lower since reserving a portion of the PD allocation for another data transmission may not be necessary in this example. In another example, the processor 110 may predict future transmissions and/or frequencies based on past transmissions and/or upper layer information. The processor 110 may then set the reserve ratio based on the predicted future transmissions and/or frequencies. For example, if data packets (e.g., data packets of a certain size) are transmitted at certain time intervals in the past, then the processor 110 may use this information to predict that data packets will be transmitted at the time intervals in the future, and set the reserve ratio accordingly (e.g., set the reserve ratio to provide enough reserve for the predicted data packet transmissions within the time-averaging window 1605).

The processor 110 may determine an allowed PD for each of the sub-time slots within the time-averaging window 1605 for the inner loop (e.g., based on equation (15)). For the first sub-time slot, the portion of the PD allocation that has been used up is zero since there are no sub-time slots within the time-averaging window 1605 preceding the first sub-time slot. For the last sub-time slot, the portion of the PD allocation reserved for future sub-time slots is zero since there are no sub-time slots within the time-averaging window 1605 after the last sub-time slot. After determining the allowed PD for each sub-time slot, the processor 110 may determine a maximum allowable power level for the sub-time slot, and set a transmission power limit of the transmitter 130 for the sub-time slot based on the determined maximum allowable power level.

In certain aspects, the processor 110 may determine the maximum allowable power level for a sub-time slot based on the allowed PD for the sub-time slot using a table. In this regard, FIG. 18 shows an example of a table 1810 for converting an allowed PD for a sub-time slot into a maximum allowable power level. The table 1810 may be stored in the memory 115.

In this example, the table 1810 includes an index for n different transmit scenarios for the transmitter 130. The n transmit scenarios may correspond to different beams, different user positions relative to the wireless device 100, etc. For each transmit scenario in the table 1810, the table 1810 includes a corresponding transmission power level at a reference PD (labeled "$Tx_1$" to "$Tx_n$"). The transmission power levels for the different transmit scenarios at the reference PD may be predetermined by performing simulations and/or measurements on the wireless device 110, and prestored in the table 1810.

To determine the maximum allowable power level for a sub-time slot based on the corresponding allowed PD, the processor 110 may determine the transmit scenario for the sub-time slot and retrieve the transmission power level in the table 1810 corresponding to the determined transmit scenario. For example, if the transmit scenarios in table 1810 correspond to different beams, then the processor 110 may determine the beam for the sub-time slot, and retrieve the transmission power level in the table 1810 corresponding to the determined beam.

After retrieving the transmission power level from the table 1810, the processor 110 may determine the maximum allowable power level for the sub-time slot by scaling the transmission power level from the table 1810 based on the allowed PD for the sub-time slot and the reference PD (e.g., scale the transmission power level from the table 1810 by a ratio of the allowed PD to the reference PD). For example, if the allowed PD is 50% smaller than the reference PD, then the processor 110 may reduce the transmission power level from the table 1810 by 50% to obtain the maximum allowable power level for the sub-time slot. If the transmission power level in the table 1810 is in decibels (dB), then the maximum allowable power level is obtained in this example by subtracting 3 dB from the transmission power in the table 1810. Thus, the maximum allowable power level for any allowed PD may be obtain by scaling the transmission power level in the table 1810 based on the allowed PD and the reference PD. This is possible since PD scales with transmission power, as discussed above.

As discussed above, when determining the allowed PD for a sub-time slot, the processor 110 may take into account the portion of the PD allocation that has been used up by past sub-time slots. In the example in equation (15), the portion of the PD allocation that has been used up by the past sub-time slots is determined by summing the PDs of the past sub-time slots. In one example, the PDs of the past sub-time slots may correspond to the allowed PDs determined for the past sub-time slots. In another example, the PDs of the past sub-time slots may correspond to the actual PDs for the past sub-time slots. The actual PD for a past sub-time slot may be the PD corresponding to the actual transmission power level used during the past sub-time slot, which may be equal to or less than the maximum allowable power level determined for the past sub-time slot. In this example, the processor 110 may record the actual transmission power levels used for the past sub-time slots, and determine the actual PDs for the past sub-time slots based on the actual transmission power levels for the past sub-time slots.

It is to be appreciated that the present disclosure is not limited to one inner loop. For example, the processor 110 may determine maximum allowable power levels using two inner loops including a first inner loop and a second inner loop. In this example, the inner loop discussed above may correspond to the first inner loop, which receives the PD limit for the future time slot 715($q$) from the outer loop, and adjusts the PD within the future time slot in sub-time slots such that the PD limit from the outer loop is met when the PD is averaged over the future time slot.

In this example, the second inner loop is below the first inner loop. The second inner loop partitions each sub-time slot in the first inner loop into smaller sub-time slots. For each sub-time slot of the first inner loop, the second inner loop receives a PD limit from the first inner loop (e.g., allowed PD for the sub-time slot of the inner loop), and adjusts the maximum allowable power level within the sub-time slot such that the PD limit is met. Within a sub-time slot of the first inner loop, the second inner loop determines the maximum allowable power level for each sub-time slot of the second inner loop within the sub-time slot of the first inner loop (e.g., based on equation (15) in which the PD limit is provided by the first inner loop). In this example, the maximum allowable power level is determined for each sub-time slot of the second inner loop.

In certain aspects, the processor 110 may use any of the techniques discussed above to determine maximum allowable power levels for different sub-6 GHz technologies at different rates. For example, the processor 110 may update the maximum allowable power level for LTE every 100 milliseconds, but update the maximum allowable power level for GSM every 5 seconds depending on how frequently or infrequently a technology changes. In this example, the processor 110 may determine a maximum allowable power level for LTE and a maximum allowable power level for GSM every 5 seconds in an outer loop. For LTE, the processor 110 may further divide a future time slot in the outer loop into sub-time slots (e.g., 50 sub-time slots), and determine a maximum allowable power level for each sub-time slot in an inner loop. The processor 110 may use the normalize SAR distribution for the future time slot in the outer loop as a normalized SAR limit in the inner loop for determining the maximum allowable power level for each sub-time slot in the inner loop.

In certain aspects, the techniques discussed above may be extended to running more than two different time intervals (i.e., update maximum allowable power levels for different technologies at more than two different update rates). To do this, the processor 110 may run different inner loops for different technologies in which the duration of one sub-time slot in each inner loop is different. In this example, the duration of one sub-time slot for each inner loop may be chosen based on the desired time interval (i.e., update rate) for the corresponding technology. In some cases, each technology may run at a specific time interval that is different from other technologies.

As discussed above, the processor 110 may determine a maximum allowable power level for a technology for a future time slot and set a transmission power limit of the corresponding transmitter (e.g., transmitter 120 or 130) based on the determined maximum allowable power level. The future time slot may be a future time slot in an outer loop (e.g., 5-second future time slot) or a future sub-time slot in an inner loop (e.g., e.g., 100-millisecond future sub-time slot). In certain aspects, the maximum allowable power level discussed above is used as a maximum allowable time-average power level for the future time slot, and therefore may be considered a maximum allowable time-average power level for the future time slot in these aspects. In the discussion below, the maximum allowable power level discussed above is referred to as the maximum allowable time-average power level.

In the above aspects, setting the transmission power limit of a transmitter based on the determined maximum allowable time-average power level prevents a time-average of the transmission power level of the transmitter over the future time slot from exceeding the maximum allowable time-average power level. The instantaneous transmission power level of the transmitter is allowed to exceed the maximum allowable time-average power level during the future time slot as long as the time-average of the power level over the future time slot does not exceed the maximum allowable time-average power level.

In the above example, the maximum allowable time-average power level for a future time slot is used to set the maximum power limit of the corresponding transmitter so that the time-average of the transmission power level over the future time slot does not exceed the maximum allowable time-average power level.

In certain aspects, the processor 110 may convert the maximum allowable time-average power level for a future time slot into a maximum allowable duty cycle for the future time slot as follows:

$$\text{Max\_duty\_cycle} = \text{Max\_avg\_}P/P_{max} \quad (18)$$

where Max_duty_cycle is the maximum allowable duty cycle for the future time slot, Max_avg_P is the maximum allowable time-average power level for the future time slot, and $P_{max}$ is a maximum allowable power level. The maximum allowable power $P_{max}$ may be a limit on the maximum allowable instantaneous power level or peak power level of the corresponding transmitter. The maximum allowable power $P_{max}$ may be defined by a standard or a regulator body. In this example, the transmitter may transmit at a power level approximately equal to $P_{max}$ during the future time slot at a duty cycle approximately equal to the maximum allowable duty cycle. The maximum duty cycle may have a value between 0 to 1.

In certain aspects, after determining the maximum allowable time-average power level for a future time slot (e.g., using any of the method discussed above), the processor 110 may determine a corresponding maximum allowable duty cycle for the future time slot based on equation (18). The processor 110 may then set a transmission duty cycle limit of the corresponding transmitter (e.g., transmitter 120 or 130) for the future time slot based on the determined the maximum allowable duty cycle. In this example, setting the transmission duty cycle limit based on the determined the maximum allowable duty cycle prevents the transmission duty cycle of the transmitter from exceeding the maximum allowable duty cycle for the future time slot. In other words, the transmission duty cycle of the transmitter for the future time slot is constrained by the determined maximum allowable duty cycle.

In certain aspects, the processor 110 may convert a maximum allowable time-average power level for a future time slot into a maximum allowable peak power for the future time slot as follows:

$$\text{Max\_peak\_power} = \text{Max\_avg\_}P/\text{Max\_duty\_cycle} \quad (19)$$

where Max_peak_power is the maximum allowable peak power for the future time slot, Max_duty_cycle is a maximum allowable duty cycle for the future time slot, and Max_avg_P is the maximum allowable time-average power level for the future time slot. The maximum allowable duty cycle can be provided by a radio frequency (RF) system (e.g., through uplink grant provided by the network), defined by standard, etc.

In certain aspects, after determining the maximum allowable time-average power level for a future time slot (e.g., using any of the method discussed above), the processor 110 may determine a corresponding maximum peak power for the future time slot based on equation (19). The processor 110 may then set a peak power limit of the corresponding transmitter (e.g., transmitter 120 or 130) for the future time slot based on the determined maximum allowable peak power. In this example, setting the peak power limit of the transmitter for the future time slot based on the determined the maximum allowable peak power prevents the peak power of the transmitter from exceeding the maximum allowable peak power. In other words, the instantaneous power level of the transmitter during the future time slot is constrained by the maximum allowable peak power so that the peak power during the future time slot does not exceed the maximum allowable peak power.

The processor 110 may also generate a table including different combinations of maximum allowable duty cycle and maximum allowable peak power for the future time slot based on the maximum allowable time-average power level for the future time slot. For example, the processor 110 may generate the table by inputting different maximum allowable duty cycles into equation (19) and determining a maximum allowable peak power for each of the different maximum allowable duty cycles. In this example, the processor may dynamically adjust the duty cycle based on the peak power during the future time slot using the table or adjust the peak power based on the transmission duty cycle during the future time slot using the table.

Thus, the processor 110 may convert the maximum allowable time-average power level for a future time slot into a maximum allowable duty cycle for the future time slot and set a transmission duty cycle limit of the corresponding transmitter based on the maximum allowable duty cycle. The processor 110 may also convert the maximum allowable time-average power level for a future time slot into a maximum allowable peak power for the future time slot and set a peak power limit of the corresponding transmitter based on the maximum allowable peak power. The maximum allowable time-average power level for the future time slot may be determined using any of the methods discussed above. For the example in which the future time slot is a future time slot in an outer loop, the maximum allowable time-average power level may correspond to the maximum allowable power level computed for the future time slot. For the example in which the future time slot is a future sub-time slot in an inner loop, the maximum allowable time-average power level may correspond to the maximum allowable power level computed for the future sub-time slot (e.g., 100-millisecond sub-time slot). It is to be appreciated that the present disclosure in not limited to these examples, and that the maximum allowable time-average power level for a future time slot may be determined using other methods.

For example, a transmitter (e.g., transmitter 120 and 130) may transmit over a time window divided (discretized) into N time slots (not to be confused with the number of sub-time slots in FIG. 18). In this example, the maximum allowable time-average power level for a future time slot may be determined by the following:

$$\frac{1}{N}\left[\left(\sum_{k=1}^{N-1} \frac{\text{avg}P_{tk}}{P_{limit}}\right) + \frac{\text{Max\_avg}P_{tN}}{P_{limit}}\right] \leq 1 \quad (20)$$

where $P_{limit}$ is a time-average transmission power which results in an RF exposure corresponding to regulator SAR limit or PD limit, $avgP_{tk}$ is the average transmission power in the $k_{th}$ time slot, the $N^{th}$ time slot is the future time slot, and $Max\_avgP_{tN}$ is the maximum allowable time-average power level for the future time slot. In equation (20), the average transmission power level is normalized with respect to $P_{limit}$. The time window may be a moving time-averaging window, in which the maximum allowable time-average power level for the future time slot is updated every time_window/N seconds where time_window is the duration of the time window. In this example, the first time slot to the $k_{th}$ time slot in equation (20) correspond to previous transmissions by the transmitter. Thus, the average transmission power levels for these time slots are known. In this example, the processor 110 may determine the maximum allowable time-average power level $Max\_avgP_{tk}$ for the future time slot by determining a maximum allowable time-average power level $Max\_avgP_{tk}$ satisfying the condition in equation (20). The processor 110 may do this by determining a maximum allowable time-average power level $Max\_avgP_{tk}$ that results in the normalized time average power on the left side of equation (20) being equal to or less than one.

In the above example, the processor 110 may convert the maximum allowable time-average power level $Max\_avgP_{tk}$ for the future time slot into a maximum allowable duty cycle for the future time slot (e.g., based on equation (18) using $Max\_avgP_{tk}$ for $Max\_avg\_P$ in equation (18)), and set a transmission duty cycle limit of the corresponding transmitter based on the maximum allowable duty cycle. The processor 110 may also convert the maximum allowable time-average power level $Max\_avgP_{tk}$ for the future time slot into a maximum allowable peak power for the future time slot (e.g., based on equation (19) using $Max\_avgP_{tk}$ for $Max\_avg\_P$ in equation (19)), and set a peak power limit of the corresponding transmitter based on the maximum allowable peak power.

In certain aspects, the memory 115 may include a computer readable medium including instructions stored thereon that, when executed by the processor 110, cause the processor 110 to perform the method 1400 and/or any other method described herein. The computer readable medium may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other tangible non-transitory storage medium, or any combination thereof.

In certain aspects, an apparatus may include means for performing the method 1400. The apparatus may include means for determining a specific absorption rate (SAR) distribution for a first wireless communication technology, means for determining a power density (PD) distribution for a second wireless communication technology, and means for combining the SAR distribution and the PD distribution to generate a combined RF exposure distribution. The apparatus may also include means for determining at least one first maximum allowable power level and at least one second maximum allowable power level for a future time slot based on the combined RF exposure distribution, means for setting at least one transmission power limit for a first transmitter in the future time slot based on the at least one first maximum allowable power level, and means for setting at least one transmission power limit for a second transmitter in the future time slot based on the at least one second maximum allowable power level.

It is to be appreciated that the present disclosure is not limited to the exemplary terms used above to describe aspects of the present disclosure, and that the present disclosure covers equivalent terms. For example, it is to be appreciated that a distribution may also be referred to as a map, a scan, or another term. In another example, it is to be appreciated that an antenna may also be referred to as an antenna element or another term. In yet another example it is to be appreciated that a maximum allowable power level may also be referred to as a power level limit or another term.

The term "approximately", as used herein with respect to a stated value or a property, is intended to indicate being within 10% of the stated value or property.

Any reference to an element herein using a designation such as "first," "second," and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A wireless device, comprising:
   a transmitter; and
   a processor coupled to the transmitter, wherein the processor is configured to:
   receive a power density (PD) limit for a time slot, the time slot comprising sub-time slots;
   determine a PD allocation for the time slot based on the PD limit;
   determine a maximum allowable power level for one of the sub-time slots based on a portion of the PD allocation used up by one or more of the sub-time slots preceding the one of the sub-time slots; and
   set a transmission power limit for the transmitter based on the maximum allowable power level.

2. The wireless device of claim 1, wherein, during the one of the sub-time slots, the transmitter is configured to transmit a signal at a transmission power level equal to or less than the transmission power limit.

3. The wireless device of claim 1, wherein the determination by the processor of the PD allocation for the time slot comprises multiplying the PD limit by a number of the sub-time slots.

4. The wireless device of claim 1, wherein the processor is configured to determine the PD allocation used up by the one or more of the sub-time slots preceding the one of the sub-time slots.

5. The wireless device of claim 4, wherein the determination by the processor of the PD allocation used up by the one or more of the sub-time slots preceding the one of the sub-time slots comprises summing PDs of the one or more of the sub-time slots preceding the one of the sub-time slots.

6. The wireless device of claim 1, wherein the processor is further configured to:
determine a portion of the PD allocation reserved for one or more of the sub-time slots succeeding the one of the sub-time slots; and
determine the maximum allowable power level for the one of the sub-time slots based also on the portion of the PD allocation reserved for the one or more of the sub-time slots succeeding the one of the sub-time slots.

7. The wireless device of claim 6, wherein the determination by the processor of the portion of the PD allocation reserved for the one or more of the sub-time slots succeeding the one of the sub-time slots comprises multiplying a reserved PD by a number of the one or more of the sub-time slots succeeding the one of the sub-time slots.

8. The wireless device of claim 7, wherein the processor is configured to determine the reserved PD based on the PD limit and a reserve ratio.

9. The wireless device of claim 8, wherein the determination by the processor of the reserved PD comprises multiplying the PD limit by the reserve ratio.

10. The wireless device of claim 8, wherein the processor is configured to set the reserve ratio based on at least one of a channel condition between the wireless device and another wireless device, or a scheduled data transmission for the wireless device.

11. The wireless device of claim 1, wherein the determination by the processor of the maximum allowable power level for the one of the sub-time slots comprises:
determining an allowed PD for the one of the sub-time slots based on the portion of the PD allocation used up by the one or more of the sub-time slots preceding the one of the sub-time slots;
retrieving a transmission power level from a memory, the transmission power level corresponding to a reference PD; and
determining the maximum allowable power level for the one of the sub-time slots based on the retrieved transmission power level, the allowed PD, and the reference PD.

12. The wireless device of claim 11, wherein the determination by the processor of the maximum allowable power level for the one of the sub-time slots based on the retrieved transmission power level, the allowed PD, and the reference PD comprises scaling the retrieved transmission power level by a ratio of the allowed PD to the reference PD.

13. The wireless device of claim 1, wherein the processor is configured to:
determine a time-averaged radio frequency (RF) exposure distribution; and
determine the PD limit for the time slot based on the time-averaged RF exposure distribution.

14. The wireless device of claim 13, wherein the determination of the time-averaged RF exposure distribution by the processor comprises:
determining a time-averaged specific absorption (SAR) distribution over a first time window;
determining a time-averaged power density (PD) distribution over a second time window; and
combining the time-averaged SAR distribution and the time-averaged PD distribution to generate the time-averaged RF exposure distribution.

15. The wireless device of claim 14, wherein the first time window and the second time window have different lengths.

16. The wireless device of claim 13, wherein the time-averaged RF exposure distribution comprises a time-averaged power density (PD) distribution.

17. A method implemented in a wireless device, comprising:
receiving a power density (PD) limit for a time slot, the time slot comprising sub-time slots;
determining a PD allocation for the time slot based on the PD limit;
determining a maximum allowable power level for one of the sub-time slots based on a portion of the PD allocation used up by one or more of the sub-time slots preceding the one of the sub-time slots; and
setting a transmission power limit for a transmitter based on the maximum allowable power level.

18. The method of claim 17, further comprising:
determining a time-averaged radio frequency (RF) exposure distribution; and
determining the PD limit for the time slot based on the time-averaged RF exposure distribution.

19. The method of claim 18, wherein determining the time-averaged RF exposure distribution comprises:
determining a time-averaged specific absorption (SAR) distribution over a first time window;
determining a time-averaged power density (PD) distribution over a second time window; and
combining the time-averaged SAR distribution and the time-averaged PD distribution to generate the time-averaged RF exposure distribution.

20. A wireless device, comprising:
a transmitter; and
a processor coupled to the transmitter, wherein the processor is configured to:
determine a time-averaged radio frequency (RF) exposure distribution over time slots;
determine an RF exposure limit for one of the time slots based on the time-averaged RF exposure distribution over the time slots, the one of the time slots comprising sub-time slots;
determine a time-averaged RF exposure distribution within the one of the time slots;
determine a maximum allowable power level for one of the sub-time slots based on the RF exposure limit and the time-averaged RF exposure distribution within the one of the time slots; and
set a transmission power limit for the transmitter based on the maximum allowable power level.

21. The wireless device of claim 20, wherein the determination of the time-averaged RF exposure distribution over the time slots by the processor comprises:
determining a time-averaged specific absorption (SAR) distribution over a first time window;
determining a time-averaged power density (PD) distribution over a second time window; and
combining the time-averaged SAR distribution and the time-averaged PD distribution to generate the time-averaged RF exposure distribution over the time slots.

22. The wireless device of claim 21, wherein the first time window and the second time window have different lengths.

23. The wireless device of claim 21, wherein the time-averaged SAR distribution corresponds to a first technology and the time-averaged PD distribution corresponds to a second technology.

24. The wireless device of claim 23, wherein the first technology comprises a sub-6 GHz technology and the second technology comprises a millimeter wave technology.

25. The wireless device of claim 23, wherein a same time-slot duration is used for the first technology and the second technology.

26. The wireless device of claim 21, wherein the time-averaged SAR distribution is normalized with respect to a SAR limit, and the time-averaged PD distribution is normalized with respect to a PD limit.

27. The wireless device of claim 21, wherein the RF exposure limit comprises a PD limit.

28. The wireless device of claim 20, wherein the time-averaged RF exposure distribution over the time slots comprises a time-averaged power density (PD) distribution, and the RF exposure limit comprises a PD limit.

29. The wireless device of claim 28, wherein the sub-time slots are normalized with respect to the PD limit.

30. The wireless device of claim 20, wherein the time-averaged RF exposure distribution over the time slots comprises a time-averaged specific absorption rate (SAR) distribution, and the RF exposure limit comprises a SAR limit.

31. The wireless device of claim 30, wherein the sub-time slots are normalized with respect to the SAR limit.

32. The wireless device of claim 20, wherein the one of the sub-time slots comprises second sub-time slots, and the processor is configured to:
  determine a second RF exposure limit for the one of the sub-time slots;
  determine a time-averaged RF exposure distribution within the one of the sub-time slots; and
  determine a maximum allowable power level for one of the second sub-time slots based on the second RF exposure limit and the time-averaged RF exposure distribution within the one of the sub-time slots.

33. The wireless device of claim 20, wherein the processor is configured to:
  determine a second RF exposure limit for a second one of the time slots based on the time-averaged RF exposure distribution over the time slots, the second one of the time slots comprising second sub-time slots;
  determine a time-averaged RF exposure distribution within the second one of the time slots; and
  determine a maximum allowable power level for one of the second sub-time slots based on the second RF exposure limit and the time-averaged RF exposure distribution within the second one of the time slots.

34. The wireless device of claim 33, wherein the first sub-time slots and the second sub-time slots have different time intervals.

35. The wireless device of claim 20, wherein the RF exposure limit comprises a power density (PD) limit, and the processor is configured to:
  determine a PD allocation based on the PD limit;
  determine a portion of the PD allocation reserved for one or more of the sub-time slots succeeding the one of the sub-time slots; and
  determine the maximum allowable power level for the one of the sub-time slots based also on the portion of the PD allocation reserved for the one or more of the sub-time slots succeeding the one of the sub-time slots.

36. The wireless device of claim 35, wherein the time-averaged RF exposure distribution within the one of the time slots is averaged over one or more of the sub-time slots preceding the one of the time slots.

37. The wireless device of claim 35, wherein the determination by the processor of the portion of the PD allocation reserved for the one or more of the sub-time slots succeeding the one of the sub-time slots comprises multiplying a reserved PD by a number of the one or more of the sub-time slots succeeding the one of the sub-time slots.

38. The wireless device of claim 37, wherein the processor is configured to determine the reserved PD based on the PD limit and a reserve ratio.

39. The wireless device of claim 38, wherein the determination by the processor of the reserved PD comprises multiplying the PD limit by the reserve ratio.

40. The wireless device of claim 38, wherein the processor is configured to set the reserve ratio based on at least one of a channel condition between the wireless device and another wireless device, or a scheduled data transmission for the wireless device.

* * * * *